United States Patent
Zhao et al.

(10) Patent No.: US 11,218,287 B2
(45) Date of Patent: Jan. 4, 2022

(54) SIGNAL TRANSMISSION METHOD AND DEVICE

(71) Applicant: BEIJING XIAOMI MOBILE SOFTWARE CO., LTD., Beijing (CN)

(72) Inventors: Qun Zhao, Beijing (CN); Yajun Zhu, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 78 days.

(21) Appl. No.: 16/649,158

(22) PCT Filed: Sep. 29, 2017

(86) PCT No.: PCT/CN2017/104425
§ 371 (c)(1),
(2) Date: Mar. 20, 2020

(87) PCT Pub. No.: WO2019/061306
PCT Pub. Date: Apr. 4, 2019

(65) Prior Publication Data
US 2020/0259628 A1  Aug. 13, 2020

(51) Int. Cl.
*H04L 5/10* (2006.01)
*H04L 5/00* (2006.01)
(Continued)

(52) U.S. Cl.
CPC ............ *H04L 5/10* (2013.01); *H04L 5/0007* (2013.01); *H04L 5/0042* (2013.01);
(Continued)

(58) Field of Classification Search
None
See application file for complete search history.

(56) References Cited

U.S. PATENT DOCUMENTS

| | | | |
|---|---|---|---|
| 2015/0092628 | A1 | 4/2015 | Zhao et al. |
| 2017/0366322 | A1 | 12/2017 | Ahn et al. |

(Continued)

FOREIGN PATENT DOCUMENTS

| | | |
|---|---|---|
| CN | 101925113 A | 12/2010 |
| CN | 103378957 A | 10/2013 |

(Continued)

OTHER PUBLICATIONS

Nokia et al.: "On the multiplexing between PUCCHs and PUSCH", 3GPP Draft R1-1710900, Jun. 26, 2017 (Jun. 26, 2017), XP051300101.
(Continued)

*Primary Examiner* — Diane L Lo
(74) *Attorney, Agent, or Firm* — Syncoda LLC; Feng Ma

(57) ABSTRACT

A signal transmission method is applied to a terminal, and includes: acquiring a first PUCCH signal and a second PUCCH signal, wherein the transmission duration of the first PUCCH signal is one designated symbol, and the transmission duration of the second PUCCH signal is greater than one designated symbol; replacing the DMRS of at S least one designated symbol in the second PUCCH signal with the first PUCCH signal to obtain a third PUCCH signal; and transmitting the third PUCCH signal to a base station, so that the base station recovers the first PUCCH signal from the third PUCCH signal, and demodulates the second PUCCH signal by taking the first PUCCH signal as the DMRS of the second PUCCH signal so as to obtain UCI carried by the second PUCCH signal.

20 Claims, 11 Drawing Sheets

A first PUCCH signal and a second PUCCH signal to be transmitted jointly are acquired. The first PUCCH signal is to be transmitted within a duration of a designated symbol. The second PUCCH signal is to be transmitted within a duration greater than the duration of the designated symbol — 110

A third PUCCH signal is acquired by replacing, with the first PUCCH signal, a DMRS of at least one of the designated symbol in the second PUCCH signal — 120

The third PUCCH signal is transmitted to a base station. Accordingly, the base station may recover the first PUCCH signal from the third PUCCH signal. The base station may acquire UCI carried by the second PUCCH signal by demodulating the second PUCCH signal taking the first PUCCH signal as a DMRS in the second PUCCH signal — 130

(51) Int. Cl.
*H04L 27/26* (2006.01)
*H04W 72/04* (2009.01)

(52) U.S. Cl.
CPC ........ *H04L 5/0051* (2013.01); *H04L 27/2605* (2013.01); *H04W 72/0413* (2013.01)

(56) References Cited

U.S. PATENT DOCUMENTS

| | | | | |
|---|---|---|---|---|
| 2019/0052422 | A1* | 2/2019 | Yin | H04L 5/005 |
| 2020/0077424 | A1* | 3/2020 | Baldemair | H04L 27/2602 |
| 2020/0236670 | A1* | 7/2020 | Xiong | H04J 13/0074 |

FOREIGN PATENT DOCUMENTS

| | | |
|---|---|---|
| CN | 103427940 A | 12/2013 |
| CN | 104185215 A | 12/2014 |
| CN | 106954261 A | 7/2017 |
| CN | 107113097 A | 8/2017 |
| CN | 109525999 A | 3/2019 |
| WO | 2012003643 A1 | 1/2012 |
| WO | 2017113332 A1 | 7/2017 |
| WO | 2019024938 A1 | 2/2019 |

OTHER PUBLICATIONS

Nokia et al.: "On URLLC UCI transmission", 3GPP Draft; R1-1716147, Sep. 17, 2017(Sep. 17, 2017), XP051339605.
"3rd Generation Partnership Project; Technical Specification Group Radio Access Network; Study on New Radio Access Technology Physical Layer Aspects (Release 14)", 3GPP Standard; Technical Report; 3GPP TR 38.802, V14.1.0, 23 J12017(Jun. 23, 2017), pp. 1-143, XP051299025.
Supplementary European Search Report in the European application No. 17926587.1, dated Mar. 9, 2021.
Intel Corporation, On low latency Scheduling Request, 3GPP TSG RAN1 WG Meeting #88bis, Apr. 7, 2017 (Apr. 7, 2017), entire document.
Hideyuki Numata et al., Investigation on Best Combining Scheme for Diversity Branches in Joint MLD for PUCCH in LTE Uplink, IEEE, Dec. 8, 2011 (Dec. 8, 2011), entire document.
International Search Report in the international application No. PCT/CN2017/104425, dated Jun. 26, 2018.
English translation of the Written Opinion of the International Search Authority in the international application No. PCT/CN2017/104425, dated Jun. 26, 2018.
First Office Action of the Chinese application No. 201780001624.7, dated Jun. 22, 2020.
Office Action of the Indian application No. 202047016510, dated Nov. 5, 2021.

* cited by examiner

SIGNAL TRANSMISSION METHOD AND DEVICE

CROSS-REFERENCE TO RELATED APPLICATION

The present application is a national stage of International Application No. PCT/CN2017/104425 filed on Sep. 29, 2017, the disclosure of which is hereby incorporated by reference in its entirety.

TECHNICAL FIELD

The subject disclosure relates to the field of communications, and in particular to a method and device for transmitting a signal.

BACKGROUND

Multiple service types may have to be configured flexibly in a next-generation communication system. In addition, different service types may have different requirements. For example, an enhanced Mobile Broad Band (eMBB) service type may mainly require a large bandwidth, a high rate, etc. An Ultra Reliable Low Latency Communication (URLLC) service type may mainly require high reliability and low latency (i.e., delay), etc. A massive Machine Type Communication (mMTC) service type may mainly require a large number of connections, etc.

In related art, when an eMBB service type and an URLLC service type, for example, are run simultaneously at User Equipment (UE), a user of the UE may apply transmission durations and scheduling cycles of different durations to different types of data. Accordingly, Physical Uplink Control CHannel (PUCCH) signals of different durations may be used for different service types.

However, when UE applies different scheduling cycles and transmission durations to data of different service types, PUCCH signals of different transmission durations and different transmission formats may have to be transmitted simultaneously. In this case, UE may transmit multiple PUCCH signals distributed over different frequency resources simultaneously. This may lead to a large Peak-to-Average Power Ratio (PAPR) and a Maximum power reduction (MPR), reducing quality of transmitting an uplink control signal.

SUMMARY

In view of this, embodiments herein provide a method and device for transmitting a signal.

According to a first aspect herein, a method for transmitting a signal may apply to User Equipment (UE). The method includes:

acquiring a first Physical Uplink Control CHannel (PUCCH) signal and a second PUCCH signal to be transmitted jointly, the first PUCCH signal being transmitted within a duration of a designated symbol, the second PUCCH signal being transmitted within a duration greater than the duration of the designated symbol;

acquiring a third PUCCH signal by replacing, with the first PUCCH signal, a Demodulation Reference Signal (DMRS) of at least one of the designated symbol in the second PUCCH signal; and transmitting the third PUCCH signal to a base station, such that the base station recovers the first PUCCH signal from the third PUCCH signal, and acquires Uplink Control Information (UCI) carried by the second PUCCH signal by demodulating the second PUCCH signal taking the first PUCCH signal as a DMRS in the second PUCCH signal.

According to an embodiment herein, the designated symbol may be an Orthogonal Frequency Division Multiplexing (OFDM) symbol. The designated symbol may be a Single-Carrier Frequency-Division Multiple Access (SCFDMA) symbol.

According to an embodiment herein, the second PUCCH signal may be transmitted in a format in which the UCI and the DMRS are arranged in a designated order in a time domain.

Replacing, with the first PUCCH signal, the DMRS in the second PUCCH signal may include:

in response to that the first PUCCH signal coincides with coinciding UCI in the second PUCCH signal in the time domain, delaying transmission of the first PUCCH signal by replacing, with the first PUCCH signal, a DMRS following the coinciding UCI and transmitting the first PUCCH signal on a time frequency resource that would have been occupied by the DMRS following the coinciding UCI; and in response to that the first PUCCH signal coincides with a coinciding DMRS in the second PUCCH signal in the time domain, replacing, with the first PUCCH signal, the coinciding DMRS, and transmitting the first PUCCH signal on a time frequency resource that would have been occupied by the coinciding DMRS.

According to an embodiment herein, the first PUCCH signal may be transmitted in a format in which different UCI is represented using different sequences.

The first PUCCH signal may be transmitted in a format in which a DMRS and UCI are arranged according to a designated density in a frequency domain.

According to an embodiment herein, symbols at one or more designated locations in the different sequences may be identical.

According to an embodiment herein, the method may further include: after replacing, with the first PUCCH signal, the DMRS in the second PUCCH signal, in response to that the first PUCCH signal and the second PUCCH signal meet a preset condition in a frequency domain, performing, on the first PUCCH signal and the second PUCCH signal, a processing operation in the frequency domain corresponding to the preset condition.

According to an embodiment herein, the preset condition may be that a first number of Physical Resource Blocks (PRB) occupied by the first PUCCH signal is greater than a second number of PRBs occupied by the second PUCCH signal.

Performing, on the first PUCCH signal and the second PUCCH signal, the processing operation in the frequency domain corresponding to the preset condition may include at least one of:

adjusting the first number of PRBs to be equal to the second number of PRBs, and adjusting a format in which the first PUCCH signal is transmitted on the adjusted first number of PRBs; or instead of adjusting the first number of PRBs and the format in which the first PUCCH signal is transmitted, adjusting a starting location starting from which the first PUCCH signal is transmitted in the frequency domain, to be a difference between a designated offset and a starting location starting from which the second PUCCH signal is transmitted in the frequency domain.

According to an embodiment herein, the preset condition may be that a first number of PRBs occupied by the first PUCCH signal is less than the second number of PRBs occupied by the second PUCCH signal.

Performing, on the first PUCCH signal and the second PUCCH signal, the processing operation in the frequency domain corresponding to the preset condition may include at least one of:

adjusting the first number of PRBs to be equal to the second number of PRBs, and adjusting a format in which the first PUCCH signal is transmitted on the adjusted first number of PRBs; or repeating the first PUCCH signal in the frequency domain until the first PUCCH signal occupies a bandwidth of the second PUCCH signal in the frequency domain; or transmitting the first PUCCH signal in a comb-like pattern such that the first PUCCH signal occupies a bandwidth of the second PUCCH signal in the frequency domain; or occupying, with the first PUCCH signal, a part of the PRBs configured for the second PUCCH signal, and transmitting the DMRS in the second PUCCH signal on remaining PRBs configured for the second PUCCH signal other than the part occupied by the first PUCCH signal.

According to an embodiment herein, transmitting the third PUCCH signal to the base station may include at least one of:

transmitting the third PUCCH signal to the base station using a parameter or mode for controlling power of the first PUCCH signal; or transmitting the third PUCCH signal to the base station using a parameter or mode for controlling power of the second PUCCH signal; or transmitting the third PUCCH signal to the base station using a power control mode or parameter differing from both the parameter or mode for controlling power of the first PUCCH signal and the parameter or mode for controlling power of the second PUCCH signal.

According to a second aspect herein, a method for transmitting a signal may apply to a base station. The method includes:

receiving a third Physical Uplink Control CHannel (PUCCH) signal sent by User Equipment (UE), the third PUCCH signal being acquired by the UE by replacing, with a first PUCCH signal, a Demodulation Reference Signal (DMRS) in a second PUCCH signal, the first PUCCH signal being transmitted within a duration of a designated symbol, the second PUCCH signal being transmitted within a duration greater than the duration of the designated symbol;

recovering the first PUCCH signal from the third PUCCH signal; and acquiring Uplink Control Information (UCI) carried by the second PUCCH signal by demodulating the second PUCCH signal taking the first PUCCH signal as a DMRS in the second PUCCH signal.

According to an embodiment herein, the first PUCCH signal may be transmitted in a format in which different UCI is represented using different sequences. Symbols at one or more designated locations in the different sequences may be identical, The method may include: after receiving the third PUCCH signal sent by the UE, instead of recovering the first PUCCH signal from the third PUCCH signal, acquiring the UCI carried by the second PUCCH signal by demodulating the second PUCCH signal taking directly the identical symbols at the one or more designated locations in the first PUCCH signal as the DMRS in the second PUCCH signal.

According to an embodiment herein, the first PUCCH signal may be transmitted in a format in which a DMRS and UCI are arranged according to a designated density in a frequency domain.

The method may include: after receiving the third PUCCH signal sent by the UE, instead of recovering the first PUCCH signal from the third PUCCH signal, acquiring the UCI carried by the second PUCCH signal by demodulating the second PUCCH signal taking a DMRS symbol at a location for the DMRS in the first PUCCH signal as the DMRS in the second PUCCH signal.

According to a third aspect herein, a device for transmitting a signal may apply to User Equipment (UE). The device includes an acquiring module, a time domain processing module, and a transmitting module.

The acquiring module is adapted to acquiring a first Physical Uplink Control CHannel (PUCCH) signal and a second PUCCH signal to be transmitted jointly. The first PUCCH signal is to be transmitted within a duration of a designated symbol. The second PUCCH signal is to be transmitted within a duration greater than the duration of the designated symbol.

The time domain processing module is adapted to acquiring a third PUCCH signal by replacing, with the first PUCCH signal, a Demodulation Reference Signal (DMRS) of at least one of the designated symbol in the second PUCCH signal.

The transmitting module is adapted to transmitting the third PUCCH signal to a base station, such that the base station recovers the first PUCCH signal from the third PUCCH signal, and acquires Uplink Control Information (UCI) carried by the second PUCCH signal by demodulating the second PUCCH signal taking the first PUCCH signal as a DMRS in the second PUCCH signal.

According to an embodiment herein, the designated symbol may be an Orthogonal Frequency Division Multiplexing (OFDM) symbol. The designated symbol may be a Single-Carrier Frequency-Division Multiple Access (SCFDMA) symbol.

According to an embodiment herein, the second PUCCH signal may be transmitted in a format in which the UCI and the DMRS are arranged in a designated order in a time domain.

The time domain processing module may include a first time domain processing sub-module and a second time domain processing sub-module.

The first time domain processing sub-module may be adapted to, in response to that the first PUCCH signal coincides with coinciding UCI in the second PUCCH signal in the time domain, delaying transmission of the first PUCCH signal by replacing, with the first PUCCH signal, a DMRS following the coinciding UCI and transmitting the first PUCCH signal on a time frequency resource that would have been occupied by the DMRS following the coinciding UCI, The second time domain processing sub-module may be adapted to, in response to that the first PUCCH signal coincides with a coinciding DMRS in the second PUCCH signal in the time domain, replacing, with the first PUCCH signal, the coinciding DMRS, and transmitting the first PUCCH signal on a time frequency resource that would have been occupied by the coinciding DMRS.

According to an embodiment herein, the first PUCCH signal may be transmitted in a format in which different UCI is represented using different sequences.

The first PUCCH signal may be transmitted in a format in which a DMRS and UCI are arranged according to a designated density in a frequency domain.

According to an embodiment herein, symbols at one or more designated locations in the different sequences may be identical.

According to an embodiment herein, the device may further include a frequency domain processing module.

The frequency domain processing module may be adapted to, in response to that the first PUCCH signal and the second PUCCH signal meet a preset condition in a frequency domain, performing, on the first PUCCH signal and the second PUCCH signal, a processing operation in the frequency domain corresponding to the preset condition.

According to an embodiment herein, the preset condition may be that a first number of Physical Resource Blocks (PRB) occupied by the first PUCCH signal is greater than a second number of PRBs occupied by the second PUCCH signal.

The frequency domain processing module may include a first frequency domain processing sub-module.

The first frequency domain processing sub-module may be adapted to at least one of:

adjusting the first number of PRBs to be equal to the second number of PRBs, and adjusting a format in which the first PUCCH signal is transmitted on the adjusted first number of PRBs; or instead of adjusting the first number of PRBs and the format in which the first PUCCH signal is transmitted, adjusting a starting location starting from which the first PUCCH signal is transmitted in the frequency domain, to be a difference between a designated offset and a starting location starting from which the second PUCCH signal is transmitted in the frequency domain.

According to an embodiment herein, the preset condition may be that a first number of PRBs occupied by the first PUCCH signal is less than the second number of PRBs occupied by the second PUCCH signal.

The frequency domain processing module may include a second frequency domain processing sub-module.

The second frequency domain processing sub-module may be adapted to at least one of:

adjusting the first number of PRBs to be equal to the second number of PRBs, and adjusting a format in which the first PUCCH signal is transmitted on the adjusted first number of PRBs; or repeating the first PUCCH signal in the frequency domain until the first PUCCH signal occupies a bandwidth of the second PUCCH signal in the frequency domain; or transmitting the first PUCCH signal in a comb-like pattern such that the first PUCCH signal occupies a bandwidth of the second PUCCH signal in the frequency domain; or occupying, with the first PUCCH signal, a part of the PRBs configured for the second PUCCH signal, and transmitting the DMRS in the second PUCCH signal on remaining PRBs configured for the second PUCCH signal other than the part occupied by the first PUCCH signal.

According to an embodiment herein, the transmitting module may include a transmitting sub-module.

The transmitting sub-module may be adapted to at least one of:

transmitting the third PUCCH signal to the base station using a parameter or mode for controlling power of the first PUCCH signal; or transmitting the third PUCCH signal to the base station using a parameter or mode for controlling power of the second PUCCH signal; or transmitting the third PUCCH signal to the base station using a power control mode or parameter differing from both the parameter or mode for controlling power of the first PUCCH signal and the parameter or mode for controlling power of the second PUCCH signal.

According to a fourth aspect herein, a device for transmitting a signal may apply to a base station. The device includes a receiving module, a recovering module, and a first demodulating module.

The receiving module is adapted to receiving a third Physical Uplink Control CHannel (PUCCH) signal sent by User Equipment (UE). The third PUCCH signal is acquired by the UE by replacing, with a first PUCCH signal, a Demodulation Reference Signal (DMRS) in a second PUCCH signal. The first PUCCH signal is to be transmitted within a duration of a designated symbol. The second PUCCH signal 1 is to be transmitted within a duration greater than the duration of the designated symbol.

The recovering module is adapted to recovering the first PUCCH signal from the third PUCCH signal.

The first demodulating module is adapted to acquiring Uplink Control Information (UCI) carried by the second PUCCH signal by demodulating the second PUCCH signal taking the first PUCCH signal as a DMRS in the second PUCCH signal.

According to an embodiment herein, the first PUCCH signal may be transmitted in a format in which different UCI is represented using different sequences. Symbols at one or more designated locations in the different sequences may be identical.

The device may further include a second demodulating module.

The second demodulating module may be adapted to, instead of recovering the first PUCCH signal from the third PUCCH signal, acquiring the UCI carried by the second PUCCH signal by demodulating the second PUCCH signal taking directly the identical symbols at the one or more designated locations in the first PUCCH signal as the DMRS in the second PUCCH signal.

According to an embodiment herein, the first PUCCH signal may be transmitted in a format in which a DMRS and UCI are arranged according to a designated density in a frequency domain.

The device may further include a third demodulating module.

The third demodulating module may be adapted to, instead of recovering the first PUCCH signal from the third PUCCH signal, acquiring the UCI carried by the second PUCCH signal by demodulating the second PUCCH signal taking a DMRS symbol at a location for the DMRS in the first PUCCH signal as the DMRS in the second PUCCH signal.

According to a fifth aspect herein, a non-transitory computer-readable storage medium has stored thereon a computer program adapted to executing the method according to the first aspect herein.

According to a sixth aspect herein, a non-transitory computer-readable storage medium having stored thereon a computer program adapted to executing the method according to the second aspect herein.

According to a seventh aspect herein, a device for transmitting a signal may apply to User Equipment (UE). The device includes a processor and memory.

The memory is adapted to storing an instruction executable by the processor.

The processor is adapted to:

acquiring a first Physical Uplink Control CHannel (PUCCH) signal and a second PUCCH signal to be transmitted jointly, the first PUCCH signal being transmitted within a duration of a designated symbol, the second PUCCH signal being transmitted within a duration greater than the duration of the designated symbol;

acquiring a third PUCCH signal by replacing, with the first PUCCH signal, a Demodulation Reference Signal (DMRS) of at least one of the designated symbol in the second PUCCH signal; and transmitting the third PUCCH signal to a base station, such that the base station recovers the first PUCCH signal from the third PUCCH signal, and acquires Uplink Control Information (UCI) carried by the second PUCCH signal by demodulating the second PUCCH signal taking the first PUCCH signal as a DMRS in the second PUCCH signal.

According to an eighth aspect herein, a device for transmitting a signal may apply to a base station. The device includes a processor and memory.

The memory is adapted to storing an instruction executable by the processor.

The processor is adapted to:

receiving a third Physical Uplink Control CHannel (PUCCH) signal sent by User Equipment (UE), the third PUCCH signal being acquired by the UE by replacing, with a first PUCCH signal, a Demodulation Reference Signal (DMRS) in a second PUCCH signal, the first PUCCH signal being transmitted within a duration of a designated symbol, the second PUCCH signal being transmitted within a duration greater than the duration of the designated symbol;

recovering the first PUCCH signal from the third PUCCH signal; and acquiring Uplink Control Information (UCI) carried by the second PUCCH signal by demodulating the second PUCCH signal taking the first PUCCH signal as a DMRS in the second PUCCH signal.

The technical solution provided by embodiments herein includes beneficial effects as follows.

With embodiments herein, UE acquires a first PUCCH signal and a second PUCCH signal to be transmitted jointly. The first PUCCH signal is to be transmitted within a duration of a designated symbol. The second PUCCH signal is to be transmitted within a duration greater than the duration of the designated symbol. The UE acquires a third PUCCH signal by replacing a DMRS in the second PUCCH signal with the first PUCCH signal. The UE transmits the third PUCCH signal to a base station, thereby avoiding a conflict when the UE simultaneously transmits PUCCH signals of different transmission durations, increasing quality of transmitting an uplink control signal, as well as increasing efficiency in signal transmission.

With embodiments herein, the base station receives a third PUCCH signal sent by UE. The third PUCCH signal is acquired by the UE by replacing, with a first PUCCH signal, a DMRS in a second PUCCH signal. The first PUCCH signal is to be transmitted within a duration of a designated symbol. The second PUCCH signal is to be transmitted within a duration greater than the duration of the designated symbol. The base station recovers the first PUCCH signal from the third PUCCH signal. The base station demodulates the second PUCCH signal taking the first PUCCH signal as a DMRS in the second PUCCH signal. Accordingly, the second PUCCH signal is acquired by demodulating the joint signal, increasing reliability in signal transmission.

The above general description and elaboration below are but exemplary and explanatory, and do not limit the subject disclosure.

BRIEF DESCRIPTION OF THE DRAWINGS

Drawings here are incorporated in and constitute part of the subject disclosure, illustrate embodiments according to the subject disclosure, and together with the subject disclosure, serve to explain the principle of the subject disclosure.

DETAILED DESCRIPTION

Figure 1:
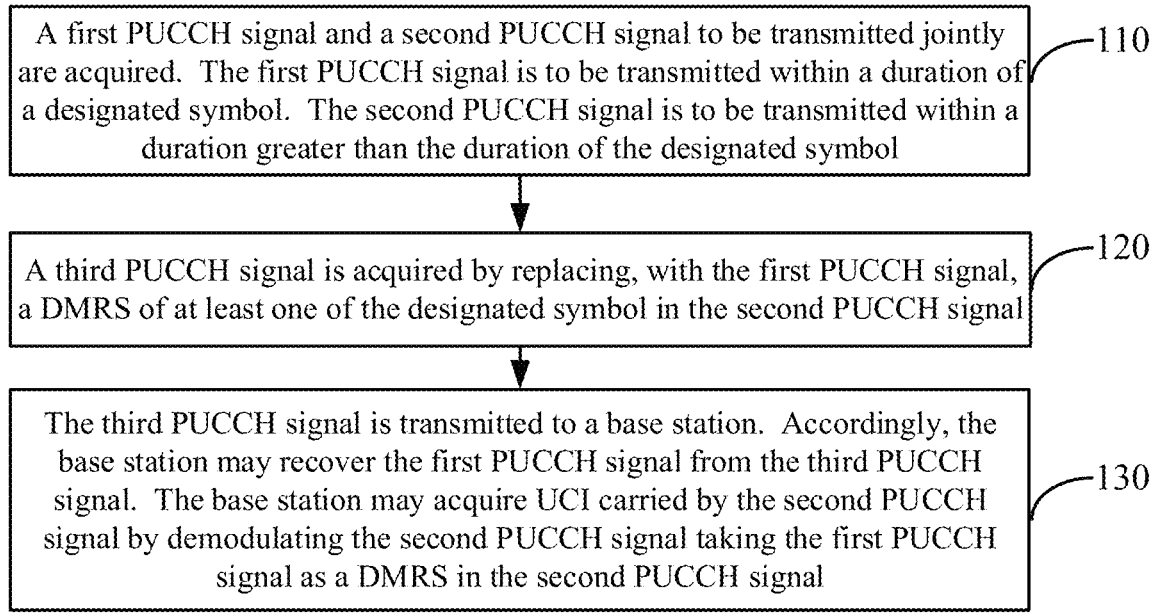
FIG. 1 is a flowchart of a method for transmitting a signal according to an exemplary embodiment.

Exemplary embodiments (examples of which are illustrated in the accompanying drawings) are elaborated below. The following description refers to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are mere examples of the device and the method in accordance with certain aspects of the subject disclosure as recited in the accompanying claims.

Terms used in the subject disclosure are for describing specific embodiments instead of limiting the subject disclosure. Singulars "a/an," "said" and "the" used in the subject disclosure and the appended claims are intended to include the plural form, unless expressly illustrated otherwise by context. The term "and/or" used in the subject disclosure refers to and includes any or all possible combinations of one or more associated items listed.

Note that although a term such as first, second, third may be adopted in an embodiment herein to describe various kinds of information, such information should not be limited to such a term. Such a term is merely for distinguishing information of the same type. For example, without departing from the scope of the embodiments herein, indication information may also be referred to as the second information. Similarly, the second information may also be referred to as indication information. Depending on the context, a term "if" as used herein may be interpreted as "when" or "while" or "in response to determining that".

Figure 2:
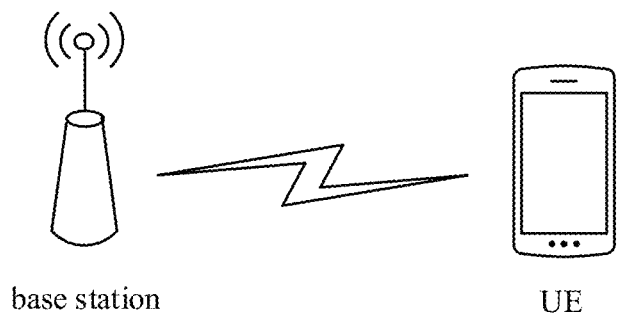
FIG. 2 is a diagram of a scene of a method for transmitting a signal according to an exemplary embodiment.

FIG. 1 is a flowchart of a method for transmitting a signal according to an exemplary embodiment. FIG. 2 is a diagram of a scene of a method for transmitting a signal according to an exemplary embodiment. The method may apply to User Equipment (UE). As shown in FIG. 1, the method for transmitting a signal may include as follows step 110-130:

In step 110, a first Physical Uplink Control CHannel (PUCCH) signal and a second PUCCH signal to be transmitted jointly is acquired. The first PUCCH signal is to be transmitted within a duration of a designated symbol. The second PUCCH signal is to be transmitted within a duration greater than the duration of the designated symbol.

According to an embodiment herein, the first PUCCH signal and the second PUCCH signal may correspond to different service types. For example, the first PUCCH signal may be transmitted within a short duration, such as of 1 symbol. The first PUCCH signal may correspond to an URLLC service type. The second PUCCH signal may be transmitted within a long duration, such as of 14 symbols. The second PUCCH signal may correspond to an eMBB service type.

According to an embodiment herein, when UE applies different scheduling cycles and transmission durations to data of different service types, PUCCH signals of different transmission durations and different transmission formats may have to be transmitted simultaneously. In this case, the UE may acquire a third PUCCH signal by joining a first PUCCH signal and a second PUCCH signal. Then, the UE may send the third PUCCH signal to a base station.

In step 120, a third PUCCH signal is acquired by replacing, with the first PUCCH signal, a Demodulation Reference Signal (DMRS) of at least one of the designated symbol in the second PUCCH signal.

According to an embodiment herein, the first PUCCH signal and the second PUCCH signal may be joined as follows. The third PUCCH signal may be acquired by directly replacing, with the first PUCCH signal, the DMRS of one or more designated symbols in the second PUCCH signal. The second PUCCH signal may include Uplink Control Information (UCI) and the DMRS.

In step 130, the third PUCCH signal is transmitted to a base station. Accordingly, the base station may recover the first PUCCH signal from the third PUCCH signal. The base station may acquire UCI carried by the second PUCCH signal by demodulating the second PUCCH signal taking the first PUCCH signal as a DMRS in the second PUCCH signal.

As shown in FIG. 2, an exemplary scene may include a base station and UE. The UE may acquire a first PUCCH signal and a second PUCCH signal that are to be transmitted respectively within different transmission durations. The UE may acquire a third PUCCH signal by directly replacing the DMRS in the second PUCCH signal with the first PUCCH signal. Then, the UE may transmit the third PUCCH signal to a base station. Having received the third PUCCH signal, the base station may recover the first PUCCH signal from the third PUCCH signal. The base station may acquire UCI carried by the second PUCCH signal by demodulating the second PUCCH signal taking the first PUCCH signal as the DMRS in the second PUCCH signal.

With an aforementioned embodiment, a first PUCCH signal and a second PUCCH signal to be transmitted jointly are acquired. The first PUCCH signal is to be transmitted within a duration of a designated symbol. The second PUCCH signal is to be transmitted within a duration greater than the duration of the designated symbol. A third PUCCH signal is acquired by replacing a DMRS in the second PUCCH signal with the first PUCCH signal. The third PUCCH signal is transmitted to a base station, thereby avoiding a conflict when UE simultaneously transmits PUCCH signals of different transmission durations, increasing quality of transmitting an uplink control signal, as well as increasing efficiency in signal transmission.

According to an embodiment herein, in step 110, the designated symbol may be an Orthogonal Frequency Division Multiplexing (OFDM) symbol. The designated symbol may be a Single-Carrier Frequency-Division Multiple Access (SCFDMA) symbol.

With an aforementioned embodiment, a designated symbol may be an OFDM symbol, an SCFDMA symbol, etc., thereby diversifying forms of expressing a transmission duration, expanding a field where signal transmission applies, increasing practicality of signal transmission.

Figure 3:
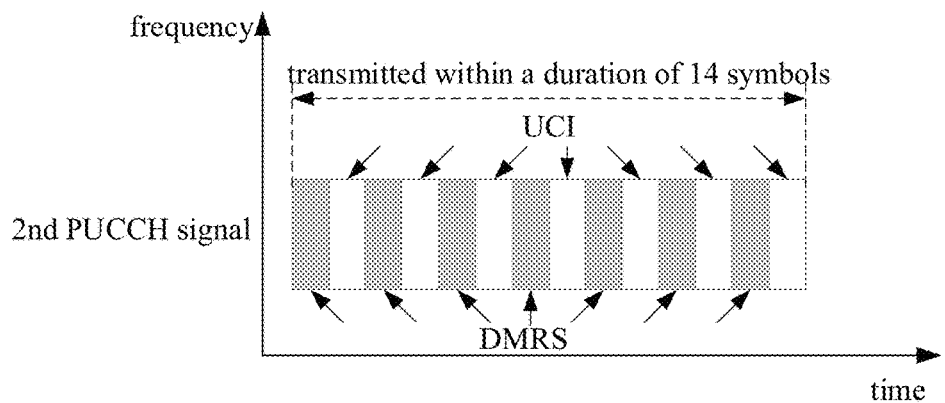
FIG. 3 is a diagram of a mode of transmitting a signal according to an exemplary embodiment.

According to an embodiment herein, the second PUCCH signal may be transmitted in a format in which the UCI and the DMRS are arranged in a designated order in a time domain. The UCI and the DMRS in the designated order may be located respectively at different symbols in the time domain. For example, the UCI and the DMRS may be arranged alternately according to a ratio 1:1, as shown in FIG. 3. In addition, the UCI and the DMRS may be arranged in another order, such as UUDUUDUUUDUUDU, in which the U may denote the UCI, the D may denote the DMRS. Step 120 may be performed as follows.

Figure 4:
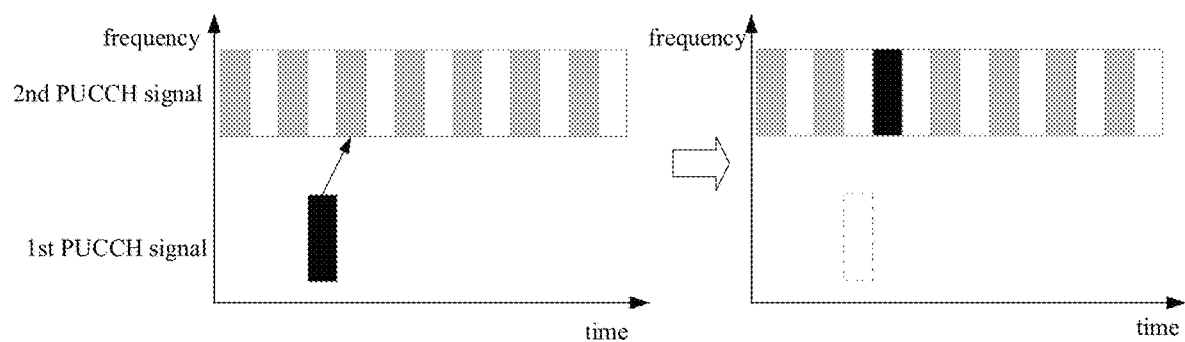
FIG. 4 is a diagram of processing a signal in a time domain according to an exemplary embodiment.

In mode (1-1) as shown in FIG. 4, when the first PUCCH signal coincides with coinciding UCI in the second PUCCH signal in the time domain, transmission of the first PUCCH signal may be delayed by replacing a DMRS following the coinciding UCI with the first PUCCH signal, and transmitting the first PUCCH signal on a time frequency resource that would have been occupied by the DMRS following the coinciding UCI.

Figure 5:
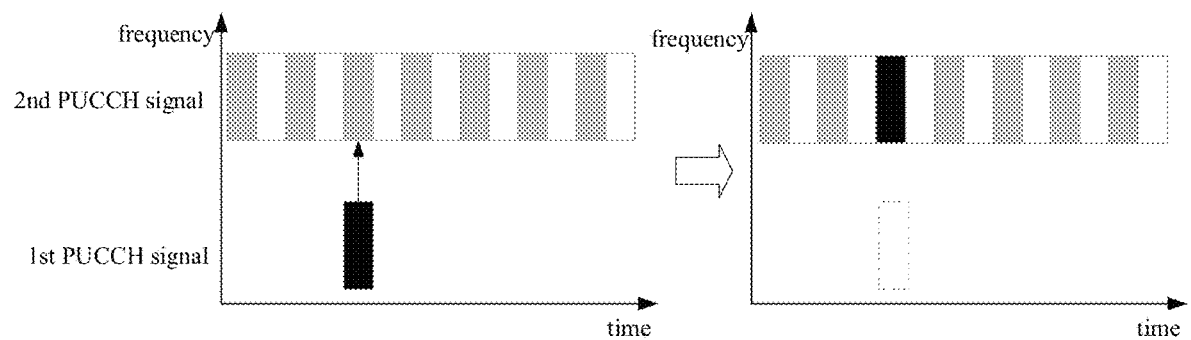
FIG. 5 is a diagram of processing a signal in a time domain according to an exemplary embodiment.

In a mode (1-2) as shown in FIG. 5, when the first PUCCH signal coincides with a coinciding DMRS in the second PUCCH signal in the time domain, the coinciding DMRS may be replaced with the first PUCCH signal. The first PUCCH signal may be transmitted on a time frequency resource that would have been occupied by the coinciding DMRS.

With an aforementioned embodiment, when the first PUCCH signal coincides with coinciding UCI in the second PUCCH signal in the time domain, a DMRS following the coinciding UCI may be replaced with the first PUCCH signal. When the first PUCCH signal coincides with a coinciding DMRS in the second PUCCH signal in the time domain, the coinciding DMRS may be replaced with the first PUCCH signal. Accordingly, a DMRS in the second PUCCH signal may be replaced with the first PUCCH signal, thereby joining the first PUCCH signal and the second PUCCH signal in the time domain, increasing reliability in signal transmission.

According to an embodiment herein, in step 110, the first PUCCH signal may be transmitted in a format as follows.

In a mode (2-1), the first PUCCH signal may be transmitted in a format in which different UCI is represented using different sequences.

In the transmission mode, if the first PUCCH signal includes UCI of no more than 2 bits, the first PUCCH signal may be transmitted in a corresponding format in which different UCI is represented using different sequences.

According to an embodiment herein, for UCI of 1 bit, "0" may be represented using a sequence N1, and "1" may be represented using a sequence N2. Information on UCE may be determined at a base station by detecting N1 and N2. For UCI of 2 bits, 4 kinds of UCI may be represented using 4 sequences. In this case, the base station may have to first detect a sequence of the first PUCCH signal. The base station may then demodulate the second PUCCH signal taking the detected sequence as a DMRS in the second PUCCH signal.

In a mode (2-2), the first PUCCH signal may be transmitted in a format in which a DMRS and UCI are arranged according to a designated density in a frequency domain.

In the transmission mode, if the first PUCCH signal includes UCI of greater than 2 bits, the first PUCCH signal may be transmitted in a corresponding format in which a DMRS and UCI are arranged according to a designated density in a frequency domain.

Figure 6:
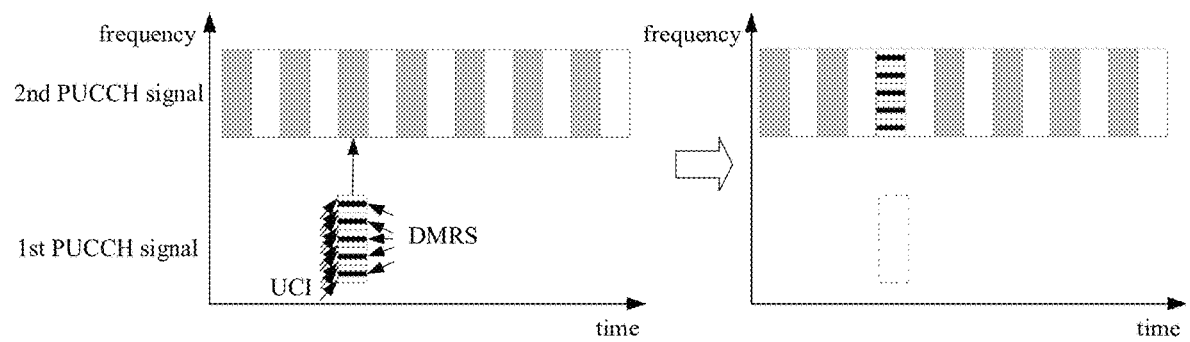
FIG. 6 is a diagram of processing a signal in a time domain according to an exemplary embodiment.

According to an embodiment herein, a designated density may refer to a form in which a DMRS and UCI are arranged in the frequency domain. For example, with a designated density of ⅓, a DMRS may be followed by 2 UCI, as shown in FIG. 6.

With an aforementioned embodiment, the first PUCCH signal may be transmitted in a format in which different UCI is represented using different sequences. The first PUCCH signal may be transmitted in a format in which a DMRS and UCI are arranged according to a designated density in a frequency domain, thereby diversifying formats in which the first PUCCH signal is transmitted, meeting different demands for transmitting the first PUCCH signal, increasing efficiency in signal transmission.

According to an embodiment herein, in aforementioned (2-1), symbols at one or more designated locations in the different sequences may be identical.

According to an embodiment herein, when different UCI is represented using different sequences, symbols at some fixed location(s) in the different sequences may be identical. For example, when a sequence of the first PUCCH signal is designed using a Const(ant) Amplitude Zero Auto-Correlation (CAZAC) sequence in LTE, different cyclic shifts of one sequence may be used as different sequences representing UCI of different bits.

Assuming a sequence of a length N, for UCI of 1 bit, two sequences with cyclic shifts i and i+N/2 (0≤i<N/2) may be selected. The two sequences may have identical symbols at locations of serial numbers 0, 2, 4 . . . thereof, as shown by sequences corresponding to UCI="0" and UCI="1" in FIG. 7. For UCI of 2 bits, four sequences with cyclic shifts i, i+N/4, i+N/2, and i+N×¾ may be selected. The different sequences may have identical symbols at locations of serial numbers 0, 4, 8, . . . , thereof, as shown by sequences corresponding to UCI="00," UCI="01," UCI="10," and UCI="11" in FIG. 7.

With an aforementioned embodiment, the second PUCCH signal may be demodulated taking identical symbols at one or more designated locations as a DMRS symbol. Accordingly, the base station may demodulate the second PUCCH signal independent of recovery of the first PUCCH signal, thereby avoiding impact of an error in recovering the first PUCCH signal on demodulation of the second PUCCH signal.

According to an embodiment herein, the method may further include a step as follows after step 110.

(3-1) If the first PUCCH signal and the second PUCCH signal meet a preset condition in a frequency domain, a processing operation in the frequency domain corresponding to the preset condition may be performed on the first PUCCH signal and the second PUCCH signal.

With an aforementioned embodiment, a processing operation in the frequency domain corresponding to the preset condition may be performed on the first PUCCH signal and the second PUCCH signal if the first PUCCH signal and the second PUCCH signal meet a preset condition in a frequency domain, thereby increasing accuracy in signal transmission.

According to an embodiment herein, for aforementioned (3-1), the preset condition may be that a first number of Physical Resource Blocks (PRB) occupied by the first PUCCH signal is greater than a second number of PRBs occupied by the second PUCCH signal. Then, the processing operation in the frequency domain corresponding to the preset condition may be performed on the first PUCCH signal and the second PUCCH signal in at least one mode as follows.

(4-1) The first number of PRBs may be adjusted to be equal to the second number of PRBs. A format in which the first PUCCH signal is transmitted on the adjusted first number of PRBs may be adjusted, such as to use a sequence of a shorter length or use modulation coding of improved efficiency.

(4-2) instead of adjusting the first number of PRBs and the format in which the first PUCCH signal is transmitted, a starting location starting from which the first PUCCH signal is transmitted in the frequency domain may be adjusted to be a difference between a designated offset and a starting location starting from which the second PUCCH signal is transmitted in the frequency domain.

The designated offset may be a preset fixed value. The designated offset may be a value configured by a base station through a downlink instruction. For example, the designated offset may be no greater than a difference between the first number of PRBs and the second number of PRBs. Accordingly, it is guaranteed that the first PUCCH signal may occupy PRBs for the second PUCCH signal in the frequency domain. In this case, the base station may schedule the first PUCCH signal to guarantee that when jointly transmitted with the second PUCCH signal, the first PUCCH signal is not interfered by uplink transmission from other UE, which may more or less impact flexibility of scheduling at the base station.

With an aforementioned embodiment, the first number of PRBs may be adjusted to be equal to the second number of PRBs. Alternatively, a starting location starting from which the first PUCCH signal is transmitted in the frequency domain may be adjusted to be a difference between a designated offset and a starting location starting from which the second PUCCH signal is transmitted in the frequency domain, avoiding interference to uplink transmission by another user when the first number of PRBs occupied by the first PUCCH signal is greater than the second number of PRBs occupied by the second PUCCH signal, thereby increasing quality of signal transmission.

According to an embodiment herein, for aforementioned (3-1), the preset condition may be that a first number of PRBs occupied by the first PUCCH signal is less than the second number of PRBs occupied by the second PUCCH signal. Then, the processing operation in the frequency domain corresponding to the preset condition may be performed on the first PUCCH signal and the second PUCCH signal in at least one mode as follows.

(5-1) The first number of PRBs may be adjusted to be equal to the second number of PRBs. A format in which the first PUCCH signal is transmitted on the adjusted first number of PRBs may be adjusted, such as to use a sequence of a shorter length or use modulation coding of improved efficiency, as shown by a mode 1 in FIG. 8.

In the mode, the number of PRBs used for transmitting the first PUCCH signal may be changed. The first PUCCH signal may be transmitted using a number of PRBs identical to a number of PRBs used for transmitting the second PUCCH signal.

For example, the first PUCCH signal of a number of UCI no greater than 2 bits may be transmitted using a longer sequence, or a sequence of a length matching a number of PRBs for the second PUCCH signal. The first PUCCH signal of a number of UCI of greater than 2 bits may be transmitted by coding UCI using a lower coding rate.

Figures 7, 8:
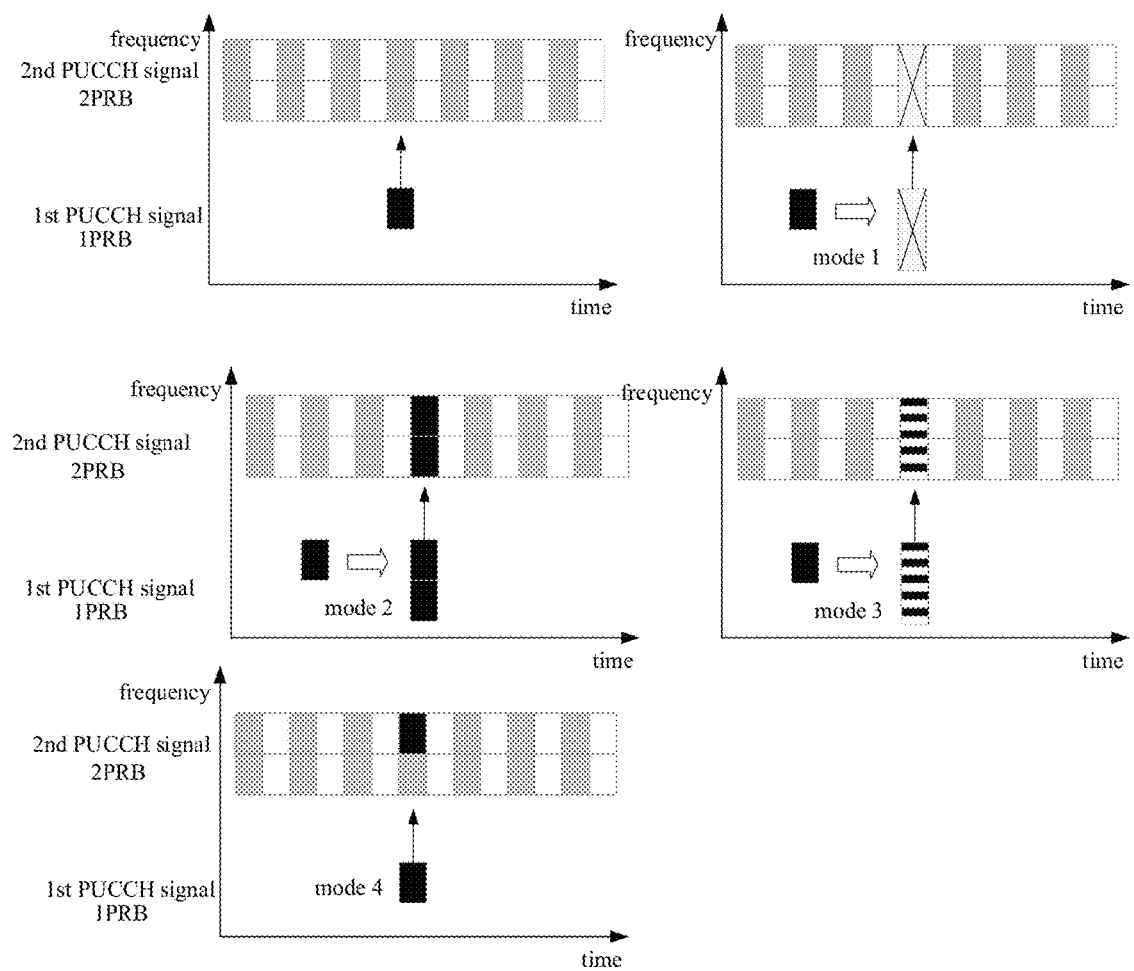
FIG. 7 is a diagram of a mode of transmitting a signal according to an exemplary embodiment.
FIG. 8 is a diagram of processing a signal in a frequency domain according to an exemplary embodiment.

(5-2) The first PUCCH signal may be repeated in the frequency domain until the first PUCCH signal occupies a bandwidth of the second PUCCH signal in the frequency domain, as shown in a mode 2 in FIG. 8.

(5-3) The first PUCCH signal may be transmitted in a comb-like pattern such that the first PUCCH signal occupies a bandwidth of the second PUCCH signal in the frequency domain, as shown in a mode 3 in FIG. 8.

(5-4) A part of the PRBs configured for the second PUCCH signal may be occupied with the first PUCCH signal. The DMRS in the second PUCCH signal may be transmitted on remaining PRBs configured for the second PUCCH signal other than the part occupied by the first PUCCH signal, as shown in a mode 4 in FIG. 8.

With an aforementioned embodiment, the first number of PRBs may be adjusted to be equal to the second number of PRBs. The first PUCCH signal may be repeated in the frequency domain until the first PUCCH signal occupies a bandwidth of the second PUCCH signal in the frequency domain. The first PUCCH signal may be transmitted in a comb-like pattern such that the first PUCCH signal occupies a bandwidth of the second PUCCH signal in the frequency domain. A part of the PRBs configured for the second PUCCH signal may be occupied with the first PUCCH signal. The DMRS in the second PUCCH signal may be transmitted on remaining PRBs configured for the second PUCCH signal other than the part occupied by the first PUCCH signal. Accordingly, the first PUCCH signal may be transmitted on PRBs configured for the second PUCCH signal in the frequency domain even when the first number of PRBs configured for the first PUCCH signal is less than the second number of PRBs configured for the second PUCCH signal, thereby increasing efficiency in signal transmission.

According to an embodiment herein, step 130 may be performed in at least one mode as follows.

(6-1) The third PUCCH signal may be transmitted to the base station using a parameter or mode for controlling power of the first PUCCH signal.

(6-2) The third PUCCH signal may be transmitted to the base station using a parameter or mode for controlling power of the second PUCCH signal.

(6-3) The third PUCCH signal may be transmitted to the base station using a power control mode or parameter differing from both the parameter or mode for controlling power of the first PUCCH signal and the parameter or mode for controlling power of the second PUCCH signal.

With an aforementioned embodiment, the third PUCCH signal may be transmitted to the base station using a parameter or mode for controlling power of the first PUCCH signal, a parameter or mode for controlling power of the second PUCCH signal, a third power control mode or parameter, etc., thereby diversifying modes of signal transmission, increasing controllability of signal transmission.

Figure 9:
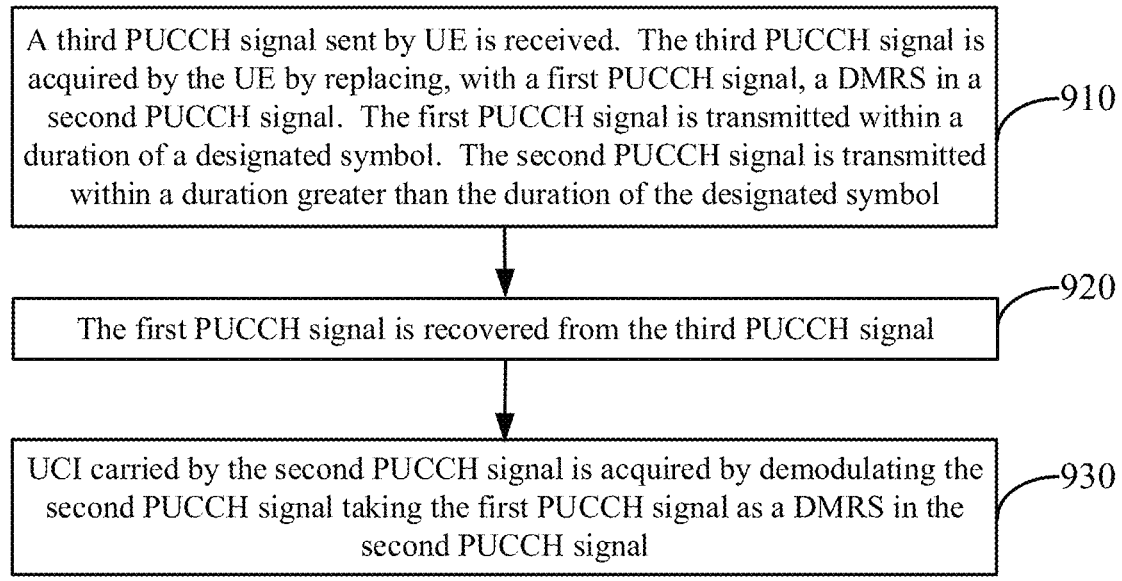
FIG. 9 is a flowchart of a method for transmitting a signal according to an exemplary embodiment.

FIG. 9 is a flowchart of a method for transmitting a signal according to an exemplary embodiment. The method may apply to a base station. As shown in FIG. 9, the method may include steps 910-930 as follows.

In step 910, a third PUCCH signal sent by UE is received. The third PUCCH signal is acquired by the UE by replacing, with a first PUCCH signal, a DMRS in a second PUCCH signal. The first PUCCH signal is to be transmitted within a duration of a designated symbol. The second PUCCH signal is to be transmitted within a duration greater than the duration of the designated symbol.

According to an embodiment herein, the first PUCCH signal and the second PUCCH signal may be transmitted respectively within different durations. For example, the first PUCCH signal may be transmitted within a duration of 1 designated symbol. The second PUCCH signal may be transmitted within a duration of 14 symbols. The designated symbol may be an OFDM symbol or an SCFDMA symbol.

In step 920, the first PUCCH signal is recovered from the third PUCCH signal.

According to an embodiment herein, the base station may recover, from the third PUCCH signal, the first PUCCH signal and UCI carried by the first PUCCH signal.

In step 930, Uplink Control Information (UCI) carried by the second PUCCH signal is acquired by demodulating the second PUCCH signal taking the first PUCCH signal as a DMRS in the second PUCCH signal.

With an aforementioned embodiment, a third PUCCH signal sent by UE is received. The third PUCCH signal is acquired by the UE by replacing, with a first PUCCH signal, a DMRS in a second PUCCH signal. The first PUCCH signal is to be transmitted within a duration of a designated symbol. The second PUCCH signal is to be transmitted within a duration greater than the duration of the designated symbol. The first PUCCH signal is recovered from the third PUCCH signal. UCI carried by the second PUCCH signal is acquired by demodulating the second PUCCH signal taking the first PUCCH signal as a DMRS in the second PUCCH signal. Accordingly, the UCI carried by the second PUCCH signal may be acquired by demodulating the joint signal, increasing reliability in signal transmission.

According to an embodiment herein, the first PUCCH signal may be transmitted in a format in which different UCI is represented using different sequences. Symbols at one or more designated locations in the different sequences may be identical. Then, after step 910, demodulation may be performed as follows.

Instead of recovering the first PUCCH signal from the third PUCCH signal, the UCI carried by the second PUCCH signal may be acquired by demodulating the second PUCCH signal taking directly the identical symbols at the one or more designated locations in the first PUCCH signal as the DMRS in the second PUCCH signal.

With an aforementioned embodiment, the first PUCCH signal may be transmitted in a format in which different UCI is represented using different sequences. Symbols at one or more designated locations in the different sequences may be identical. Then, the second PUCCH signal may be demodulated taking the identical symbols at the one or more designated locations in the first PUCCH signal as the DMRS in the second PUCCH signal without recovering the first PUCCH signal. Accordingly, the second PUCCH signal may be demodulated independent of recovery of the first PUCCH signal, thus avoiding impact of an error in recovering the first PUCCH signal on demodulation of the second PUCCH signal, thereby diversifying modes of demodulation by the base station, improving efficiency in signal demodulation.

According to an embodiment herein, the first PUCCH signal may be transmitted in a format in which a DMRS and UCI are arranged according to a designated density in a frequency domain. Then, after step 910, demodulation may be performed as follows.

Instead of recovering the first PUCCH signal from the third PUCCH signal, the UCI carried by the second PUCCH signal may be acquired by demodulating the second PUCCH signal taking a DMRS symbol at a location for the DMRS in the first PUCCH signal as the DMRS in the second PUCCH signal.

With an aforementioned embodiment, the first PUCCH signal may be transmitted in a format in which a DMRS and UCI are arranged according to a designated density in a frequency domain. Then, the second PUCCH signal may be demodulated taking a DMRS symbol at a location for the DMRS in the first PUCCH signal as the DMRS in the second PUCCH signal without recovering the first PUCCH signal. Accordingly, the second PUCCH signal may be demodulated independent of recovery of the first PUCCH signal, thus avoiding impact of an error in recovering the first PUCCH signal on demodulation of the second PUCCH signal, thereby diversifying modes of demodulation by the base station, improving efficiency in signal demodulation.

A device for transmitting a signal according to an embodiment herein corresponds to an aforementioned method for transmitting a signal according to an embodiment herein.

Figure 10:
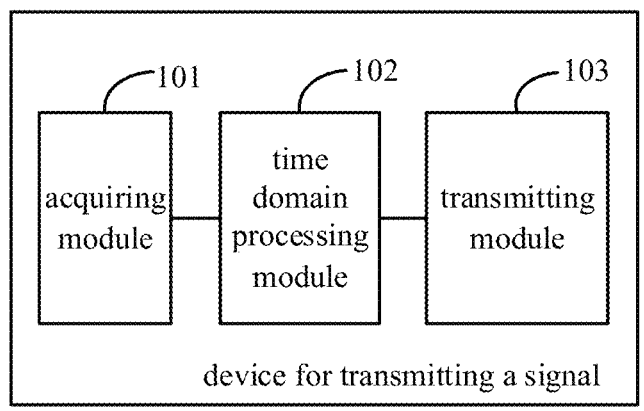
FIG. 10 is a block diagram of a device for transmitting a signal according to an exemplary embodiment.

FIG. 10 is a block diagram of a device for transmitting a signal according to an exemplary embodiment. The device may apply to UE. The device may be adapted to executing the method for transmitting a signal as shown in FIG. 1. As shown in FIG. 10, the device may include an acquiring module, a time domain processing module, and a transmitting module.

The acquiring module 101 may be adapted to acquiring a first Physical Uplink Control CHannel (PUCCH) signal and a second PUCCH signal to be transmitted jointly. The first PUCCH signal is to be transmitted within a duration of a designated symbol. The second PUCCH signal is to be transmitted within a duration greater than the duration of the designated symbol.

The time domain processing module 102 may be adapted to acquiring a third PUCCH signal by replacing, with the first PUCCH signal, a Demodulation Reference Signal (DMRS) of at least one of the designated symbol in the second PUCCH signal.

The transmitting module 103 may be adapted to transmitting the third PUCCH signal to a base station. Accordingly, the base station may recover the first PUCCH signal from the third PUCCH signal. The base station may acquire UCI carried by the second PUCCH signal by demodulating the second PUCCH signal taking the first PUCCH signal as a DMRS in the second PUCCH signal.

With an aforementioned embodiment, a first PUCCH signal and a second PUCCH signal to be transmitted jointly are acquired. The first PUCCH signal is to be transmitted within a duration of a designated symbol. The second PUCCH signal is to be transmitted within a duration greater than the duration of the designated symbol. A third PUCCH signal is acquired by replacing a DMRS in the second PUCCH signal with the first PUCCH signal. The third PUCCH signal is transmitted to a base station, thereby avoiding a conflict when UE simultaneously transmits PUCCH signals of different transmission durations, increasing quality of transmitting an uplink control signal, as well as increasing efficiency in signal transmission.

According to an embodiment herein, the designated symbol may be an Orthogonal Frequency Division Multiplexing (OFDM) symbol. The designated symbol may be a Single-Carrier Frequency-Division Multiple Access (SCFDMA) symbol.

With an aforementioned embodiment, a designated symbol may be an OFDM symbol, an SCFDMA symbol, etc., thereby diversifying forms of expressing a transmission duration, expanding a field where signal transmission applies, increasing practicality of signal transmission.

Figure 11:
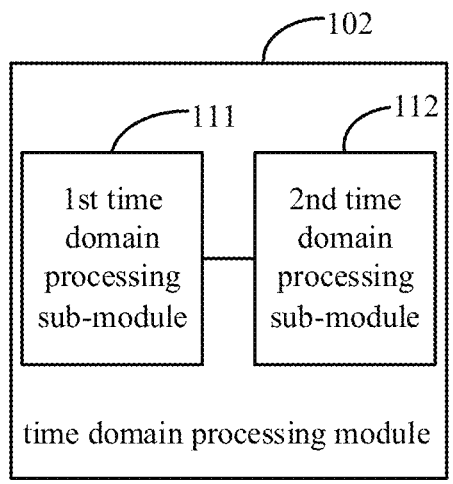
FIG. 11 is a block diagram of a device for transmitting a signal according to an exemplary embodiment.

According to an embodiment herein, as shown in FIG. 11, the second PUCCH signal may be transmitted in a format in which the UCI and the DMRS are arranged in a designated order in a time domain. The time domain processing module 102 may include a first time domain processing sub-module and a second time domain processing sub-module.

The first time domain processing sub-module 111 may be adapted to, in response to that the first PUCCH signal coincides with coinciding UCI in the second PUCCH signal in the time domain, delaying transmission of the first PUCCH signal by replacing, with the first PUCCH signal, a DMRS following the coinciding UCI and transmitting the first PUCCH signal on a time frequency resource that would have been occupied by the DMRS following the coinciding UCI.

The second time domain processing sub-module 112 may be adapted to, in response to that the first PUCCH signal coincides with a coinciding DMRS in the second PUCCH signal in the time domain, replacing, with the first PUCCH signal, the coinciding DMRS, and transmitting the first PUCCH signal on a time frequency resource that would have been occupied by the coinciding DMRS.

With an aforementioned embodiment, when the first PUCCH signal coincides with coinciding UCI in the second PUCCH signal in the time domain, a DMRS following the coinciding UCI may be replaced with the first PUCCH signal. When the first PUCCH signal coincides with a coinciding DMRS in the second PUCCH signal in the time domain, the coinciding DMRS may be replaced with the first PUCCH signal. Accordingly, a DMRS in the second PUCCH signal may be replaced with the first PUCCH signal, thereby joining the first PUCCH signal and the second PUCCH signal in the time domain, increasing reliability in signal transmission.

According to an embodiment herein, the first PUCCH signal may be transmitted in a format as follows.

The first PUCCH signal may be transmitted in a format in which different UCI is represented using different sequences.

The first PUCCH signal may be transmitted in a format in which a DMRS and UCI are arranged according to a designated density in a frequency domain.

With an aforementioned embodiment, the first PUCCH signal may be transmitted in a format in which different UCI is represented using different sequences. The first PUCCH signal may be transmitted in a format in which a DMRS and UCI are arranged according to a designated density in a frequency domain, thereby diversifying formats in which the first PUCCH signal is transmitted, meeting different demands for transmitting the first PUCCH signal, increasing efficiency in signal transmission.

According to an embodiment herein, symbols at one or more designated locations in the different sequences may be identical.

With an aforementioned embodiment, the second PUCCH signal may be demodulated taking identical symbols at one or more designated locations as a DMRS symbol. Accordingly, the base station may demodulate the second PUCCH signal independent of recovery of the first PUCCH signal, thereby avoiding impact of an error in recovering the first PUCCH signal on demodulation of the second PUCCH signal.

Figure 12:
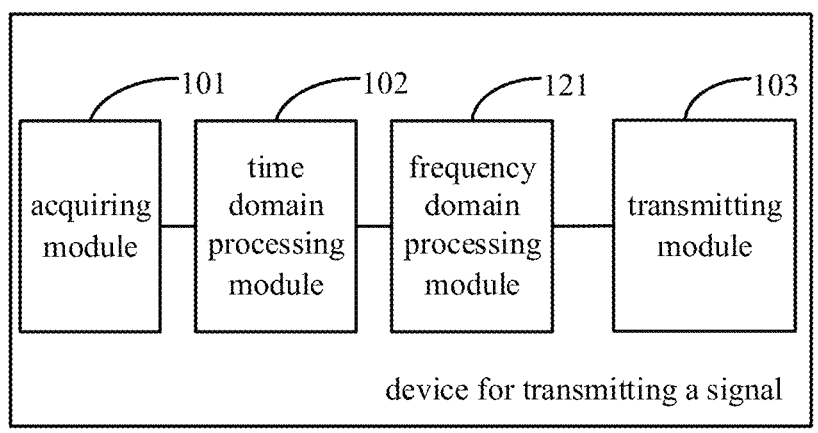
FIG. 12 is a block diagram of a device for transmitting a signal according to an exemplary embodiment.

According to an embodiment herein, as shown in FIG. 12, the device for transmitting a signal may further include a frequency domain processing module.

The frequency domain processing module 121 may be adapted to, in response to that the first PUCCH signal and the second PUCCH signal meet a preset condition in a frequency domain, performing, on the first PUCCH signal and the second PUCCH signal, a processing operation in the frequency domain corresponding to the preset condition.

With an aforementioned embodiment, a processing operation in the frequency domain corresponding to the preset condition may be performed on the first PUCCH signal and the second PUCCH signal if the first PUCCH signal and the second PUCCH signal meet a preset condition in a frequency domain, thereby increasing accuracy in signal transmission.

Figure 13:
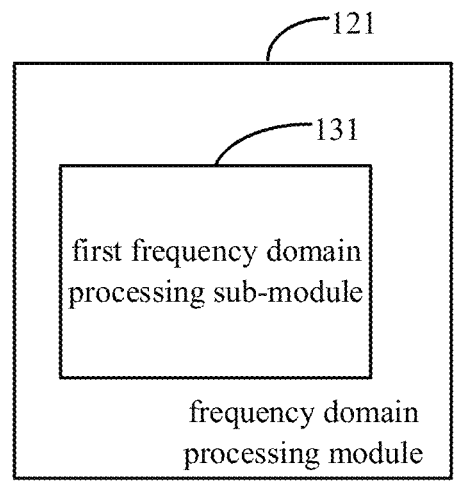
FIG. 13 is a block diagram of a device for transmitting a signal according to an exemplary embodiment.

According to an embodiment herein, as shown in FIG. 13, the preset condition may be that a first number of Physical Resource Blocks (PRB) occupied by the first PUCCH signal is greater than a second number of PRBs occupied by the second PUCCH signal. The frequency domain processing module 121 may include a first frequency domain processing sub-module.

The first frequency domain processing sub-module 131 may be adapted to adjusting the first number of PRBs to be equal to the second number of PRBs.

The first frequency domain processing sub-module may be adapted to adjusting a format in which the first PUCCH signal is transmitted on the adjusted first number of PRBs.

The first frequency domain processing sub-module may be adapted to, instead of adjusting the first number of PRBs and the format in which the first PUCCH signal is transmitted, adjusting a starting location starting from which the first PUCCH signal is transmitted in the frequency domain, to be a difference between a designated offset and a starting location starting from which the second PUCCH signal is transmitted in the frequency domain.

With an aforementioned embodiment, the first number of PRBs may be adjusted to be equal to the second number of PRBs. Alternatively, a starting location starting from which the first PUCCH signal is transmitted in the frequency domain may be adjusted to be a difference between a designated offset and a starting location starting from which the second PUCCH signal is transmitted in the frequency domain, avoiding interference to uplink transmission by another user when the first number of PRBs occupied by the first PUCCH signal is greater than the second number of PRBs occupied by the second PUCCH signal, thereby increasing quality of signal transmission.

Figure 14:
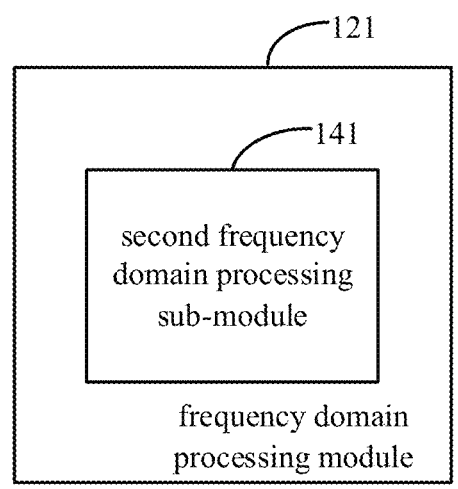
FIG. 14 is a block diagram of a device for transmitting a signal according to an exemplary embodiment.

According to an embodiment herein, as shown in FIG. 14, the preset condition may be that a first number of PRBs occupied by the first PUCCH signal is less than the second number of PRBs occupied by the second PUCCH signal.

The frequency domain processing module 121 may include a second frequency domain processing sub-module.

The second frequency domain processing sub-module 141 may be adapted to adjusting the first number of PRBs to be equal to the second number of PRBs.

The second frequency domain processing sub-module may be adapted to adjusting a format in which the first PUCCH signal is transmitted on the adjusted first number of PRBs.

The second frequency domain processing sub-module may be adapted to repeating the first PUCCH signal in the frequency domain until the first PUCCH signal occupies a bandwidth of the second PUCCH signal in the frequency domain.

The second frequency domain processing sub-module may be adapted to transmitting the first PUCCH signal in a comb-like pattern such that the first PUCCH signal occupies a bandwidth of the second PUCCH signal in the frequency domain.

The second frequency domain processing sub-module may be adapted to occupying, with the first PUCCH signal, a part of the PRBs configured for the second PUCCH signal, and transmitting the DMRS in the second PUCCH signal on remaining PRBs configured for the second PUCCH signal other than the part occupied by the first PUCCH signal.

With an aforementioned embodiment, the first number of PRBs may be adjusted to be equal to the second number of PRBs. The first PUCCH signal may be repeated in the frequency domain until the first PUCCH signal occupies a bandwidth of the second PUCCH signal in the frequency domain. The first PUCCH signal may be transmitted in a comb-like pattern such that the first PUCCH signal occupies a bandwidth of the second PUCCH signal in the frequency domain. A part of the PRBs configured for the second PUCCH signal may be occupied with the first PUCCH signal. The DMRS in the second PUCCH signal may be transmitted on remaining PRBs configured for the second PUCCH signal other than the part occupied by the first PUCCH signal. Accordingly, the first PUCCH signal may be transmitted on PRBs configured for the second PUCCH signal in the frequency domain even when the first number of PRBs configured for the first PUCCH signal is less than the second number of PRBs configured for the second PUCCH signal, thereby increasing efficiency in signal transmission.

Figure 15:
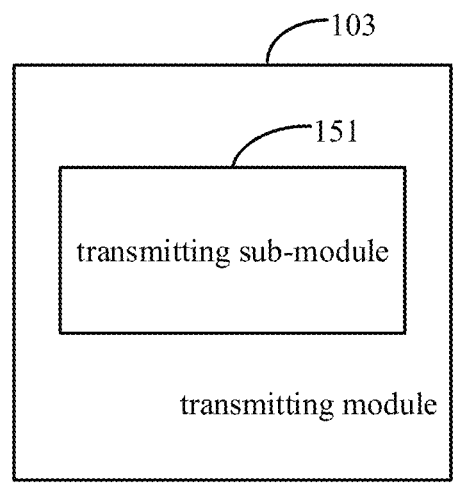
FIG. 15 is a block diagram of a device for transmitting a signal according to an exemplary embodiment.

According to an embodiment herein, as shown in FIG. 15, the transmitting module 103 may include a transmitting sub-module.

The transmitting sub-module 151 may be adapted to transmitting the third PUCCH signal to the base station using a parameter or mode for controlling power of the first PUCCH signal.

The transmitting sub-module may be adapted to transmitting the third PUCCH signal to the base station using a parameter or mode for controlling power of the second PUCCH signal.

The transmitting sub-module may be adapted to transmitting the third PUCCH signal to the base station using a power control mode or parameter differing from both the parameter or mode for controlling power of the first PUCCH signal and the parameter or mode for controlling power of the second PUCCH signal.

With an aforementioned embodiment, the third PUCCH signal may be transmitted to the base station using a parameter or mode for controlling power of the first PUCCH signal, a parameter or mode for controlling power of the second PUCCH signal, a third power control mode or parameter, etc., thereby diversifying modes of signal transmission, increasing controllability of signal transmission.

Figure 16:
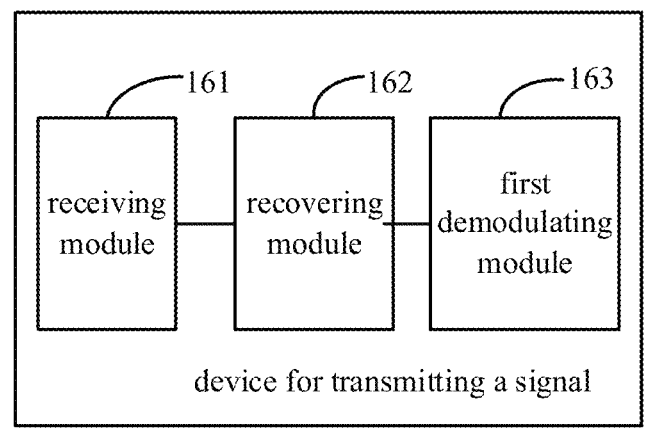
FIG. 16 is a block diagram of a device for transmitting a signal according to an exemplary embodiment.

FIG. 16 is a block diagram of a device for transmitting a signal according to an exemplary embodiment. The device may apply to a base station. The device may be adapted to executing the method for transmitting a signal as shown in FIG. 9. As shown in FIG. 16, the device may include a receiving module, a recovering module, and a first demodulating module.

The receiving module 161 may be adapted to receiving a third Physical Uplink Control CHannel (PUCCH) signal sent by User Equipment (UE). The third PUCCH signal is acquired by the UE by replacing, with a first PUCCH signal, a DMRS in a second PUCCH signal. The first PUCCH signal is to be transmitted within a duration of a designated symbol. The second PUCCH signal is to be transmitted within a duration greater than the duration of the designated symbol.

The recovering module 162 may be adapted to recovering the first PUCCH signal from the third PUCCH signal.

The first demodulating module 163 may be adapted to acquiring Uplink Control Information (UCI) carried by the second PUCCH signal by demodulating the second PUCCH signal taking the first PUCCH signal as a DMRS in the second PUCCH signal.

With an aforementioned embodiment, a third PUCCH signal sent by UE is received. The third PUCCH signal is acquired by the UE by replacing, with a first PUCCH signal, a DMRS in a second PUCCH signal. The first PUCCH signal is to be transmitted within a duration of a designated symbol. The second PUCCH signal is to be transmitted within a duration greater than the duration of the designated symbol. The first PUCCH signal is recovered from the third PUCCH signal. UCI carried by the second PUCCH signal is acquired by demodulating the second PUCCH signal taking the first PUCCH signal as a DMRS in the second PUCCH signal. Accordingly, the UCI carried by the second PUCCH signal may be acquired by demodulating the joint signal, increasing reliability in signal transmission.

Figure 17:
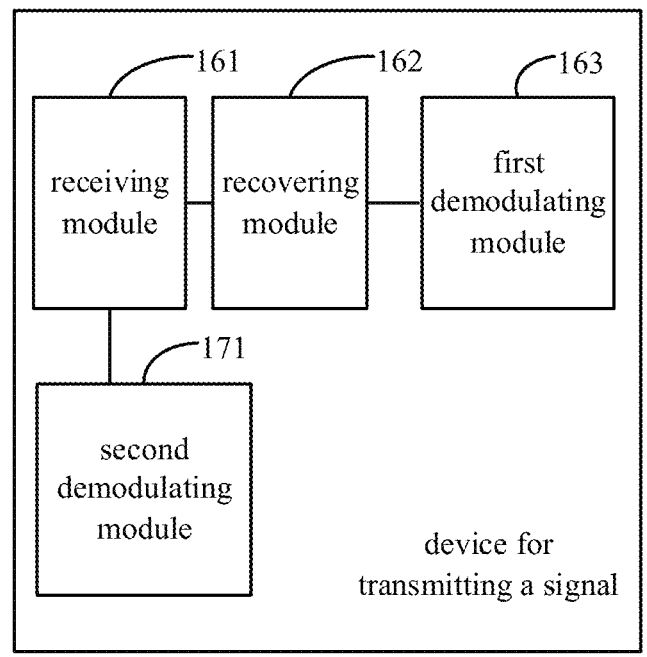
FIG. 17 is a block diagram of a device for transmitting a signal according to an exemplary embodiment.

According to an embodiment herein, as shown in FIG. 17, the first PUCCH signal may be transmitted in a format in which different UCI is represented using different sequences. Symbols at one or more designated locations in the different sequences may be identical. The device may further include a second demodulating module.

The second demodulating module 171 may be adapted to, instead of recovering the first PUCCH signal from the third PUCCH signal, acquiring the UCI carried by the second PUCCH signal by demodulating the second PUCCH signal taking directly the identical symbols at the one or more designated locations in the first PUCCH signal as the DMRS in the second PUCCH signal.

With an aforementioned embodiment, the first PUCCH signal may be transmitted in a format in which different UCI is represented using different sequences. Symbols at one or more designated locations in the different sequences may be identical. Then, the second PUCCH signal may be demodulated taking the identical symbols at the one or more designated locations in the first PUCCH signal as the DMRS in the second PUCCH signal without recovering the first PUCCH signal. Accordingly, the second PUCCH signal may be demodulated independent of recovery of the first PUCCH signal, thus avoiding impact of an error in recovering the first PUCCH signal on demodulation of the second PUCCH signal, thereby diversifying modes of demodulation by the base station, improving efficiency in signal demodulation.

Figure 18:
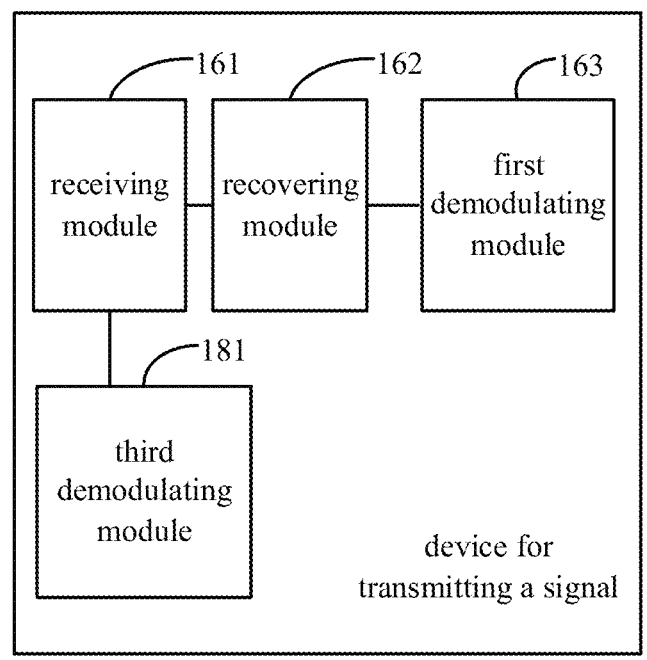
FIG. 18 is a block diagram of a device for transmitting a signal according to an exemplary embodiment.

According to an embodiment herein, as shown in FIG. 18, the first PUCCH signal may be transmitted in a format in which a DMRS and UCI are arranged according to a designated density in a frequency domain. The device may further include a third demodulating module.

The third demodulating module 181 may be adapted to, instead of recovering the first PUCCH signal from the third PUCCH signal, acquiring the UCI carried by the second PUCCH signal by demodulating the second PUCCH signal taking a DMRS symbol at a location for the DMRS in the first PUCCH signal as the DMRS in the second PUCCH signal.

With an aforementioned embodiment, the first PUCCH signal may be transmitted in a format in which a DMRS and UCI are arranged according to a designated density in a frequency domain. Then, the second PUCCH signal may be demodulated taking a DMRS symbol at a location for the DMRS in the first PUCCH signal as the DMRS in the second PUCCH signal without recovering the first PUCCH signal. Accordingly, the second PUCCH signal may be demodulated independent of recovery of the first PUCCH signal, thus avoiding impact of an error in recovering the first PUCCH signal on demodulation of the second PUCCH signal, thereby diversifying modes of demodulation by the base station, improving efficiency in signal demodulation.

A device embodiment herein basically corresponds to a method embodiment herein, description of which may be referred to for a related part thereof. A device embodiment described herein is but schematic. Units described herein as separate parts may or may not be physically separate. A part displayed as a unit may or may not be a physical unit. That is, it may be located in one place, or distributed over multiple network units. Some or all of the modules herein may be selected as needed to achieve an effect of a solution herein. A person having ordinary skill in the art may understand implement the above without creative effort.

According to an embodiment herein, a non-transitory computer-readable storage medium has stored thereon a computer program. The computer program is adapted to executing the method for transmitting a signal according to any one of FIG. 1 through FIG. 8.

According to an embodiment herein, a non-transitory computer-readable storage medium has stored thereon a computer program. The computer program is adapted to executing the method for transmitting a signal according to FIG. 9.

According to an embodiment herein, a device for transmitting a signal may apply to UE. The device may include a processor and memory.

The memory is adapted to storing an instruction executable by the processor.

The processor is adapted to:

acquiring a first Physical Uplink Control CHannel (PUCCH) signal and a second PUCCH signal to be transmitted jointly, the first PUCCH signal being transmitted within a duration of a designated symbol, the second PUCCH signal being transmitted within a duration greater than the duration of the designated symbol;

acquiring a third PUCCH signal by replacing, with the first PUCCH signal, a Demodulation Reference Signal (DMRS) of at least one of the designated symbol in the second PUCCH signal; and transmitting the third PUCCH signal to a base station. Accordingly, the base station may recover the first PUCCH signal from the third PUCCH signal. The base station may acquire UCI carried by the second PUCCH signal by demodulating the second PUCCH signal taking the first PUCCH signal as a DMRS in the second PUCCH signal.

Figure 19:
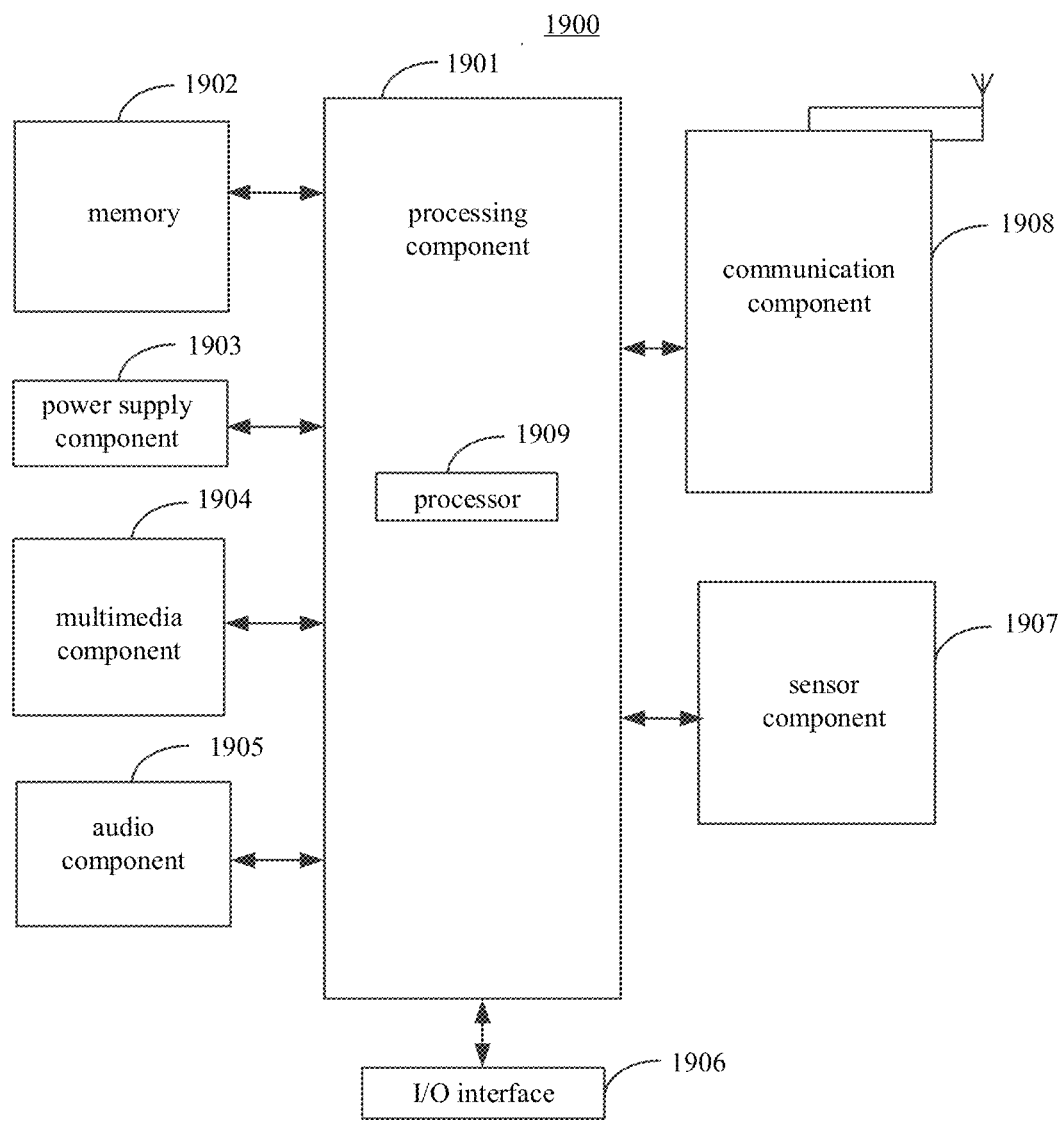
FIG. 19 is a diagram of a structure of a device for transmitting a signal according to an exemplary embodiment.

FIG. 19 is a diagram of a structure of a device for transmitting a signal according to an exemplary embodiment. A device 1900 for transmitting a signal according to an exemplary embodiment is as shown in FIG. 19. The device 1900 may be UE such as a computer, a mobile phone, a digital broadcast terminal, messaging equipment, a gaming console, tablet equipment, medical equipment, exercise equipment, a personal digital assistant, etc.

Referring to FIG. 19, the device 1900 may include at least one of a processing component 1901, memory 1902, a power supply component 1903, a multimedia component 1904, an audio component 1905, an Input/Output (I/O) interface 1906, a sensor component 1907, a communication component 1908, etc.

The processing component 1901 may generally control an overall operation of the device 1900, such as operations associated with display, a telephone call, data communication, a camera operation, a recording operation, etc. The processing component 1901 may include one or more processors 1909 to execute instructions so as to complete all or a part of an aforementioned method. In addition, the processing component 1901 may include one or more portions to facilitate interaction between the processing component 1901 and other components. For example, the processing component 1901 may include a multimedia portion to facilitate interaction between the multimedia component 1904 and the processing component 1901.

The memory 1902 may be adapted to storing various types of data to support the operation at the device 1900. Examples of such data may include instructions of any application or method adapted to operating on the device 1900, contact data, phonebook data, messages, pictures, videos, etc. The memory 1902 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 1903 may supply electric power to various components of the device 1900. The power supply component 1903 may include a power management system, one or more power sources, and other components related to generating, managing, and distributing electricity for the device 1900.

The multimedia component 1904 may include a screen that provides an output interface between the device 1900 and a user. The screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 1904 may include at least one of a front camera or a rear camera. When the device 1900 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 1905 may be adapted to outputting and/or inputting an audio signal. For example, the audio component 1905 may include a microphone (MIC). When the device 1900 is in an operation mode such as a call mode, a recording mode, a voice recognition mode, etc., the MIC may be adapted to receiving an external audio signal. The received audio signal may be further stored in the memory 1902 or may be sent via the communication component 1908. The audio component 1905 may further include a loudspeaker adapted to outputting the audio signal.

The I/O interface 1906 may provide an interface between the processing component 1901 and a peripheral interface portion. Such a peripheral interface portion may be a keypad, a click wheel, a button, etc. Such a button may include but is not limited to at least one of a homepage button, a volume button, a start button, or a lock button.

The sensor component 1907 may include one or more sensors for assessing various states of the device 1900. For example, the sensor component 1907 may detect an on/off state of the device 1900 and relative positioning of components such as the display and the keypad of the device 1900. The sensor component 1907 may further detect a change in the position of the device 1900 or of a component of the device 1900, whether there is contact between the device 1900 and a user, the orientation or acceleration/deceleration of the device 1900, a change in the temperature of the device 1900, etc. The sensor component 1907 may include a proximity sensor adapted to detecting existence of a nearby object without physical contact. The sensor component 1907 may further include an optical sensor such as a Complementary Metal-Oxide-Semiconductor (CMOS) or a Charge-Coupled-Device (CCD) image sensor used in an imaging application. The sensor component 1907 may further include an acceleration sensor, a gyroscope sensor, a magnetic sensor, a pressure sensor, a temperature sensor, etc.

The communication component 1908 may be adapted to facilitating wired or wireless communication between the device 1900 and other equipment. The device 1900 may access a wireless network based on a communication standard such as Wi-Fi, 2G, 3G . . . , or a combination thereof. The communication component 1908 may broadcast related information or receive a broadcast signal from an external broadcast management system via a broadcast channel. The communication component 1908 may include a Near Field Communication (NFC) portion for short-range communication. For example, the NFC portion may be based on technology such as Radio Frequency Identification (RFID), Infrared Data Association (IrDA), Ultra-Wideband (UWB) technology, Bluetooth (BT), etc.

The device 1900 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

A non-transitory computer-readable storage medium including instructions, such as memory 1902 including instructions, may be provided. The instructions may be executed by the processor 1909 of the device 1900 to implement an aforementioned method. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

When the instructions in the storage medium are executed by the processor, the device 1900 is allowed to perform any abovementioned method for transmitting a signal.

According to an embodiment herein, a device for transmitting a signal may apply to a base station. The device may include a processor and memory.

The memory is adapted to storing an instruction executable by the processor.

The processor is adapted to:

receiving a third Physical Uplink Control CHannel (PUCCH) signal sent by User Equipment (UE), wherein the third PUCCH signal is acquired by the UE by replacing, with a first PUCCH signal, a Demodulation Reference Signal (DMRS) in a second PUCCH signal, the first PUCCH signal being transmitted within a duration of a designated symbol, the second PUCCH signal being transmitted within a duration greater than the duration of the designated symbol;

recovering the first PUCCH signal from the third PUCCH signal; and acquiring Uplink Control Information (UCI) carried by the second PUCCH signal by demodulating the second PUCCH signal taking the first PUCCH signal as a DMRS in the second PUCCH signal.

Figure 20:
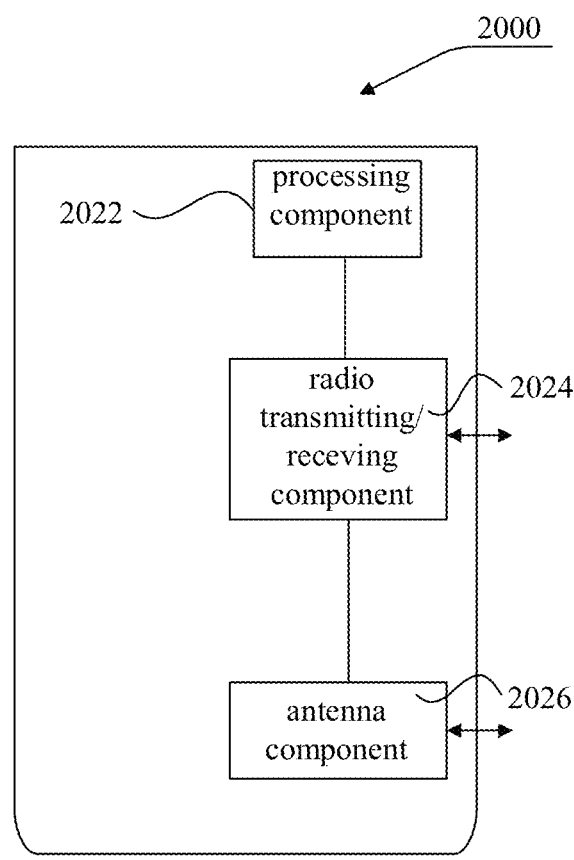
FIG. 20 is a diagram of a structure of a device for transmitting a signal according to an exemplary embodiment.

FIG. 20 is a diagram of a structure of a device for transmitting a signal according to an exemplary embodiment. As shown in FIG. 20, the device 2000 may be provided as a base station. Referring to FIG. 20, the device 2000 includes a processing component 2022, a radio transmitting/receiving component 2024, an antenna component 2026, and a signal processing part dedicated to a radio interface. The processing component 2022 may further include one or more processors.

A processor of the processing component 2022 may be adapted to performing any aforementioned method for transmitting a signal.

Other implementations of the subject disclosure will be apparent to a person having ordinary skill in the art that has considered the specification and or practiced the subject disclosure. The subject disclosure is intended to cover any variation, use, or adaptation of the subject disclosure following the general principles of the subject disclosure and including such departures from the subject disclosure as come within common knowledge or customary practice in the art. The specification and the embodiments are intended to be exemplary only, with a true scope and spirit of the subject disclosure being indicated by the appended claims.

Note that the subject disclosure is not limited to the exact construction that has been described above and illustrated in the accompanying drawings, and that various modifications and changes can be made to the subject disclosure without departing from the scope of the subject disclosure. It is intended that the scope of the subject disclosure is limited only by the appended claims.

The invention claimed is:

1. A method for transmitting a signal, applying to User Equipment (UE), the method comprising:

acquiring a first Physical Uplink Control CHannel (PUCCH) signal and a second PUCCH signal to be transmitted jointly, the first PUCCH signal being transmitted within a duration of a designated symbol, the second PUCCH signal being transmitted within a duration greater than the duration of the designated symbol;

acquiring a third PUCCH signal by replacing, with the first PUCCH signal, a Demodulation Reference Signal (DMRS) of at least one of the designated symbol in the second PUCCH signal; and transmitting the third PUCCH signal to a base station, such that the base station recovers the first PUCCH signal from the third PUCCH signal, and acquires Uplink Control Information (UCI) carried by the second PUCCH signal by demodulating the second PUCCH signal taking the first PUCCH signal as a DMRS in the second PUCCH signal.

2. The method of claim 1, wherein the designated symbol is an Orthogonal Frequency Division Multiplexing (OFDM) symbol or a Single-Carrier Frequency-Division Multiple Access (SCFDMA) symbol.

3. The method of claim 1, wherein the second PUCCH signal is transmitted in a format in which the UCI and the DMRS are arranged in a designated order in a time domain, wherein replacing, with the first PUCCH signal, the DMRS of the at least one of the designated symbol in the second PUCCH signal comprises:

in response to that the first PUCCH signal coincides with coinciding UCI in the second PUCCH signal in the time domain, delaying transmission of the first PUCCH signal by replacing, with the first PUCCH signal, a DMRS following the coinciding UCI and transmitting the first PUCCH signal on a time frequency resource that would have been occupied by the DMRS following the coinciding UCI; and in response to that the first PUCCH signal coincides with a coinciding DMRS in the second PUCCH signal in the time domain, replacing, with the first PUCCH signal, the coinciding DMRS, and transmitting the first PUCCH signal on a time frequency resource that would have been occupied by the coinciding DMRS.

4. The method of claim 1, wherein the first PUCCH signal is transmitted in a format in which different UCI is represented using different sequences, or wherein the first PUCCH signal is transmitted in a format in which a DMRS and UCI are arranged according to a designated density in a frequency domain.

5. The method of claim 4, wherein symbols at one or more designated locations in the different sequences are identical.

6. The method of claim 1, further comprising: after replacing, with the first PUCCH signal, the DMRS of the at least one of the designated symbol in the second PUCCH signal, in response to that the first PUCCH signal and the second PUCCH signal meet a preset condition in a frequency domain, performing, on the first PUCCH signal and the second PUCCH signal, a processing operation in the frequency domain corresponding to the preset condition.

7. The method of claim 6, wherein the preset condition is that a first number of Physical Resource Blocks (PRB) occupied by the first PUCCH signal is greater than a second number of PRBs occupied by the second PUCCH signal, wherein performing, on the first PUCCH signal and the second PUCCH signal, the processing operation in the frequency domain corresponding to the preset condition comprises at least one of:

adjusting the first number of PRBs to be equal to the second number of PRBs, and adjusting a format in which the first PUCCH signal is transmitted on the adjusted first number of PRBs; or instead of adjusting the first number of PRBs and the format in which the first PUCCH signal is transmitted, adjusting a starting location starting from which the first PUCCH signal is transmitted in the frequency domain, to be a difference between a designated offset and a starting location starting from which the second PUCCH signal is transmitted in the frequency domain.

8. The method of claim 6, wherein the preset condition is that a first number of PRBs occupied by the first PUCCH signal is less than the second number of PRBs occupied by the second PUCCH signal,
wherein performing, on the first PUCCH signal and the second PUCCH signal, the processing operation in the frequency domain corresponding to the preset condition comprises at least one of:
adjusting the first number of PRBs to be equal to the second number of PRBs, and adjusting a format in which the first PUCCH signal is transmitted on the adjusted first number of PRBs; or
repeating the first PUCCH signal in the frequency domain until the first PUCCH signal occupies a bandwidth of the second PUCCH signal in the frequency domain; or
transmitting the first PUCCH signal in a comb-like pattern such that the first PUCCH signal occupies a bandwidth of the second PUCCH signal in the frequency domain; or
occupying, with the first PUCCH signal, a part of the PRBs configured for the second PUCCH signal, and transmitting the DMRS in the second PUCCH signal on remaining PRBs configured for the second PUCCH signal other than the part occupied by the first PUCCH signal.

9. The method of claim 1, wherein transmitting the third PUCCH signal to the base station comprises at least one of:
transmitting the third PUCCH signal to the base station using a parameter or mode for controlling power of the first PUCCH signal; or
transmitting the third PUCCH signal to the base station using a parameter or mode for controlling power of the second PUCCH signal; or
transmitting the third PUCCH signal to the base station using a power control mode or parameter differing from both the parameter or mode for controlling power of the first PUCCH signal and the parameter or mode for controlling power of the second PUCCH signal.

10. A communication system implementing the method of claim 1, comprising the UE and the base station,
wherein the UE is configured to:
acquire the first PUCCH signal and the second PUCCH signal to be transmitted jointly; the first PUCCH signal is to be transmitted within a duration of a designated symbol; the second PUCCH signal is to be transmitted within a duration greater than the duration of the designated symbol;
acquire the third PUCCH signal by replacing a DMRS in the second PUCCH signal with the first PUCCH signal;
transmit the third PUCCH signal to a base station, thereby avoiding a conflict when the UE simultaneously transmits PUCCH signals of different transmission durations, increasing quality of transmitting an uplink control signal, and increasing efficiency in signal transmission; and
wherein the base station is configured to:
receive a third Physical Uplink Control CHannel (PUCCH) signal sent by User Equipment (UE), wherein the third PUCCH signal is acquired by the UE by replacing, with a first PUCCH signal, a Demodulation Reference Signal (DMRS) in a second PUCCH signal, the first PUCCH signal being transmitted within a duration of a designated symbol, the second PUCCH signal being transmitted within a duration greater than the duration of the designated symbol;
recover the first PUCCH signal from the third PUCCH signal; and
acquire Uplink Control Information (UCI) carried by the second PUCCH signal by demodulating the second PUCCH signal taking the first PUCCH signal as a DMRS in the second PUCCH signal; wherein the second PUCCH signal is acquired by demodulating a joint signal, thereby increasing reliability in signal transmission.

11. A method for transmitting a signal, applying to a base station, the method comprising:
receiving a third Physical Uplink Control CHannel (PUCCH) signal sent by User Equipment (UE), wherein the third PUCCH signal is acquired by the UE by replacing, with a first PUCCH signal, a Demodulation Reference Signal (DMRS) in a second PUCCH signal, the first PUCCH signal being transmitted within a duration of a designated symbol, the second PUCCH signal being transmitted within a duration greater than the duration of the designated symbol;
recovering the first PUCCH signal from the third PUCCH signal; and
acquiring Uplink Control Information (UCI) carried by the second PUCCH signal by demodulating the second PUCCH signal taking the first PUCCH signal as a DMRS in the second PUCCH signal.

12. The method of claim 11, wherein the first PUCCH signal is transmitted in a format in which different UCI is represented using different sequences, wherein symbols at one or more designated locations in the different sequences are identical,
wherein the method comprises: after receiving the third PUCCH signal sent by the UE,
instead of recovering the first PUCCH signal from the third PUCCH signal, acquiring the UCI carried by the second PUCCH signal by demodulating the second PUCCH signal taking directly the identical symbols at the one or more designated locations in the first PUCCH signal as the DMRS in the second PUCCH signal.

13. The method of claim 11, wherein the first PUCCH signal is transmitted in a format in which a DMRS and UCI are arranged according to a designated density in a frequency domain,
wherein the method comprises: after receiving the third PUCCH signal sent by the UE,
instead of recovering the first PUCCH signal from the third PUCCH signal, acquiring the UCI carried by the second PUCCH signal by demodulating the second PUCCH signal taking a DMRS symbol at a location for the DMRS in the first PUCCH signal as the DMRS in the second PUCCH signal.

14. A device for transmitting a signal implementing the method of claim 11, applying to a base station, the device comprising a processor and memory,
wherein the memory is adapted to storing an instruction executable by the processor,
wherein the processor is adapted to implementing operations the method,
wherein the first PUCCH signal is transmitted in a format in which different UCI is represented using different sequences, wherein symbols at one or more designated locations in the different sequences are identical,
wherein the processor is adapted to,
instead of recovering the first PUCCH signal from the third PUCCH signal, acquiring the UCI carried by the second PUCCH signal by demodulating the second PUCCH signal taking directly the identical symbols at the one or more designated locations in the first PUCCH signal as the DMRS in the second PUCCH signal.

15. A device for transmitting a signal, applying to User Equipment (UE), the device comprising a processor and memory,
wherein the memory is adapted to storing an instruction executable by the processor,
wherein the processor is adapted to:
acquiring a first Physical Uplink Control CHannel (PUCCH) signal and a second PUCCH signal to be transmitted jointly, the first PUCCH signal being transmitted within a duration of a designated symbol, the second PUCCH signal being transmitted within a duration greater than the duration of the designated symbol;
acquiring a third PUCCH signal by replacing, with the first PUCCH signal, a Demodulation Reference Signal (DMRS) of at least one of the designated symbol in the second PUCCH signal; and
transmitting the third PUCCH signal to a base station, such that the base station recovers the first PUCCH signal from the third PUCCH signal, and acquires Uplink Control Information (UCI) carried by the second PUCCH signal by demodulating the second PUCCH signal taking the first PUCCH signal as a DMRS in the second PUCCH signal.

16. The device of claim 15, wherein the designated symbol is an Orthogonal Frequency Division Multiplexing (OFDM) symbol or a Single-Carrier Frequency-Division Multiple Access (SCFDMA) symbol.

17. The device of claim 15, wherein the second PUCCH signal is transmitted in a format in which the UCI and the DMRS are arranged in a designated order in a time domain,
wherein the processor is adapted to:
in response to that the first PUCCH signal coincides with coinciding UCI in the second PUCCH signal in the time domain, delaying transmission of the first PUCCH signal by replacing, with the first PUCCH signal, a DMRS following the coinciding UCI and transmitting the first PUCCH signal on a time frequency resource that would have been occupied by the DMRS following the coinciding UCI; and
in response to that the first PUCCH signal coincides with a coinciding DMRS in the second PUCCH signal in the time domain, replacing, with the first PUCCH signal, the coinciding DMRS, and transmitting the first PUCCH signal on a time frequency resource that would have been occupied by the coinciding DMRS.

18. The device of claim 15,
wherein the first PUCCH signal is transmitted in a format in which different UCI is represented using different sequences, or
wherein the first PUCCH signal is transmitted in a format in which a DMRS and UCI are arranged according to a designated density in a frequency domain.

19. The device of claim 15, wherein the processor is adapted to,
in response to that the first PUCCH signal and the second PUCCH signal meet a preset condition in a frequency domain, performing, on the first PUCCH signal and the second PUCCH signal, a processing operation in the frequency domain corresponding to the preset condition.

20. The device of claim 15, wherein the processor is adapted to implement at least one of:
transmitting the third PUCCH signal to the base station using a parameter or mode for controlling power of the first PUCCH signal; or
transmitting the third PUCCH signal to the base station using a parameter or mode for controlling power of the second PUCCH signal; or
transmitting the third PUCCH signal to the base station using a power control mode or parameter differing from both the parameter or mode for controlling power of the first PUCCH signal and the parameter or mode for controlling power of the second PUCCH signal.

* * * * *